US 8,178,608 B2
May 15, 2012

(12) United States Patent
Nakamura et al.

(54) THERMOPLASTIC RESIN COMPOSITION AND RESIN MOLDED ARTICLE

(75) Inventors: Makoto Nakamura, Kanagawa-ken (JP); Hiroshi Nakano, Kanagawa-ken (JP); Katsuhiro Otsuka, Tokyo (JP); Kazutoyo Matsumura, Osaka (JP)

(73) Assignees: Mitsubishi Engineering-Plastics Corporation, Tokyo (JP); Matsumura Sangyo Co., Ltd., Osaka-shi, Osaka-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/297,127

(22) PCT Filed: Apr. 3, 2007

(86) PCT No.: PCT/JP2007/000360
§ 371 (c)(1),
(2), (4) Date: Aug. 28, 2009

(87) PCT Pub. No.: WO2007/129437
PCT Pub. Date: Nov. 15, 2007

(65) Prior Publication Data
US 2010/0010141 A1    Jan. 14, 2010

(30) Foreign Application Priority Data
Apr. 13, 2006 (JP) ................................ 2006-111289

(51) Int. Cl.
*C08K 3/32* (2006.01)
*C08K 9/08* (2006.01)
*C08K 9/04* (2006.01)

(52) U.S. Cl. ......... 524/417; 524/451; 106/469; 106/487

(58) Field of Classification Search .................. 524/451, 524/417; 106/469, 487
See application file for complete search history.

(56) References Cited

U.S. PATENT DOCUMENTS

| 3,953,539 A * | 4/1976 | Kawase et al. ................. 524/116 |
| 4,088,709 A * | 5/1978 | Seymour et al. ............... 524/151 |
| 4,879,333 A * | 11/1989 | Frazee ........................ 524/460 |
| 4,912,249 A * | 3/1990 | Kupper et al. ................. 560/67 |
| 5,637,643 A | 6/1997 | Umeda et al. |
| 5,961,710 A | 10/1999 | Linde et al. |
| 5,981,126 A * | 11/1999 | Majumdar et al. ............... 430/63 |
| 6,001,903 A * | 12/1999 | Nakamae et al. .................. 524/3 |
| 6,441,063 B1 * | 8/2002 | Kudo et al. .................... 523/218 |
| 6,713,553 B2 * | 3/2004 | Gonnon et al. ................ 524/552 |
| 7,732,520 B2 * | 6/2010 | Onizawa et al. ............... 524/449 |
| 2004/0116578 A1 * | 6/2004 | Imanishi et al. ............... 524/445 |
| 2004/0147655 A1 * | 7/2004 | Sawaki et al. ................. 524/425 |
| 2004/0178383 A1 * | 9/2004 | Kikuchi .......................... 252/62 |
| 2004/0197561 A1 * | 10/2004 | Suzuki et al. ................. 428/407 |
| 2005/0161183 A1 * | 7/2005 | Covarrubias ................... 162/158 |
| 2009/0215934 A1 | 8/2009 | Nakamura et al. |

FOREIGN PATENT DOCUMENTS

| EP | 1 992 663 A1 | | 11/2008 |
| JP | 04309551 A | * | 11/1992 |
| JP | 10-101914 | | 4/1998 |
| JP | 2001019756 A | * | 1/2001 |
| JP | 2004217942 A | * | 8/2004 |
| JP | 2005-104794 | | 4/2005 |
| JP | 2005-104794 A | | 4/2005 |
| JP | 2006-077176 | | 3/2006 |
| JP | 2006-077176 A | | 3/2006 |
| JP | 2006-111822 | | 4/2006 |
| JP | 2006/111822 A | | 4/2006 |
| JP | 2006-111822 A | | 4/2006 |
| WO | 02/042382 | | 5/2002 |
| WO | WO 2006098461 A1 | * | 9/2006 |

OTHER PUBLICATIONS

Machine translated English equivalent of JP 2001019756 A, 2001, pp. 1-15.*
Machine translated English equivalent of JP 2004217942 A, 2004, pp. 1-9.*
CAPlus Abstract of JP 04309551 A, AN 1993:170372, 2 pages.*
International Search Report for PCT/JP2007/000360, mailed Jun. 5, 2007.

* cited by examiner

*Primary Examiner* — David W Wu
*Assistant Examiner* — Brieann R Fink
(74) *Attorney, Agent, or Firm* — Nixon & Vanderhye P.C.

(57) ABSTRACT

The present invention relates to a thermoplastic resin composition which comprises 100 parts by weight of a thermoplastic resin (component A) and 1 to 400 parts by weight of a granular inorganic filler (component B) comprising an inorganic filler having an average particle diameter of 0.01 to 100 μm and a water-soluble polyester resin binder, and having a bulk density of 0.4 to 1.5 g/mL; and a resin molded article obtained by molding the thermoplastic resin composition. The thermoplastic resin composition is improved in various properties such as extrusion moldability, rigidity, impact resistance, thermal stability and hue, and exhibits an excellent balance between these properties.

5 Claims, No Drawings

THERMOPLASTIC RESIN COMPOSITION AND RESIN MOLDED ARTICLE

This application is the U.S. national phase of International Application No. PCT/JP2007/000360, filed 3 Apr. 2007, which designated the U.S. and claims priority to Japanese Application No. 2006-111289, filed 13 Apr. 2006, the entire contents of each of which are hereby incorporated by reference.

TECHNICAL FIELD

The present invention relates to a thermoplastic resin composition and a resin molded article, and more particularly, to a thermoplastic resin composition comprising a granular inorganic filler which is enhanced in various properties such as extrusion moldability, rigidity, impact resistance, thermal stability and hue, and exhibits an excellent balance between these properties, and a resin molded article obtained by molding the thermoplastic resin composition.

BACKGROUND ART

Thermoplastic resins have been used in various extensive applications such as electric, electronic and OA equipments, vehicles, building materials, agricultural materials and sundries because the resins are excellent in various properties such as mechanical properties, electric properties, light weight and moldability. In addition, as the method for improving a rigidity, a strength, dimensional characteristics, etc., of the thermoplastic resins, a method of incorporating inorganic fillers thereinto has been generally and extensively used. In the applications requiring a good appearance, there have been proposed many methods for incorporating small size inorganic fillers such as talc into the resins. Also, in recent years, in the application fields of interior parts, exterior parts and outer plate parts of vehicles as well as various housing members which need to exhibit a good appearance, it has been required that these molded articles have an increased size and a high rigidity. Therefore, as to the impact resistance required for these molded articles, impact characteristics such as a surface impact strength becomes more important rather than Izod impact strength owing to the relation with a strain rate thereof. As a result, it is required to provide a material capable of further improving these impact characteristics by incorporating small size inorganic fillers thereinto.

However, when incorporating the small size inorganic fillers into the thermoplastic resins, there tend to arise problems such as clogging of a hopper, deteriorated extrusion moldability such as poor intrusion into an extruder, and low impact resistance of the resultant resin composition owing to poor dispersion of the inorganic fillers therein. In addition, when incorporating the inorganic fillers into engineering plastics having a high extruding or molding temperature, there tend to arise problems such as deterioration in thermal stability and hue. In particular, in the case where silicate compounds such as talc are incorporated into thermoplastic resin compositions comprising an aromatic polycarbonate resin, adverse influences by decomposition of the resin tend to be remarkably caused, resulting in problems such as deterioration in impact resistance, thermal stability, hue, etc.

Thus, in the application fields of thermoplastic resin compositions into which small size inorganic fillers are incorporated, it has been strongly demanded to develop materials which are excellent in various properties such as extrusion moldability, rigidity, impact resistance, thermal stability and hue. To solve the above conventional problems, there have been proposed, for example, the techniques using, as the small size filler, a talc that is increased in bulk specific gravity by mechanical compression (for example, refer to Patent Documents 1 and 2), and the technique using a talc having a specific electric conductivity (for example, refer to Patent Document 3). In addition, in the Patent Document 3, it is described that the talc is preferably in the form of a compressed and granulated product, and the talc may be granulated using a binder. However, even when using the techniques specifically described in these Patent documents, the obtained thermoplastic resin compositions are still unsatisfactory in extrusion moldability, thermal stability and impact resistance.

On the other hand, there have been proposed the technique employing a granular inorganic filler that is granulated by using a binder (for example, refer to Patent Document 4), and a thermoplastic resin composition obtained by incorporating a granular talc granulated using a specific amount of bentonite, in engineering plastics such as aromatic polycarbonate resins (for example, refer to Patent Document 5). However, the thermoplastic resin compositions obtained by incorporating the granular talc granulated by using a binder into engineering plastics such as aromatic polycarbonate resins as described in these Patent Documents, are not necessarily satisfactory in impact resistance, thermal stability and hue.

Patent Document 1: Japanese Patent Application Laid-Open (KOKAI) No. 8-176339
Patent Document 2: Japanese Patent Application Laid-Open (KOKAI) No. 10-101914
Patent Document 3: Japanese Patent Application Laid-Open (KOKAI) No. 2002-60637
Patent Document 4: Japanese Patent Application Laid-Open (KOKAI) No. 2002-220549
Patent Document 5: Japanese Patent Application Laid-Open (KOKAI) No. 2006-77176

DISCLOSURE OF THE INVENTION

Problem to be Solved by the Invention

An object of the present invention is to overcome the above problems encountered in the prior art, and provide a thermoplastic resin composition that is improved in various properties such as extrusion moldability, rigidity, impact resistance, thermal stability and hue, and exhibits an excellent balance between these properties, as well as a resin molded article obtained by molding the thermoplastic resin composition.

Means for Solving the Problem

As a result of the present inventors' earnest study for solving the above conventional problems, it has been found that the thermoplastic resin composition obtained by incorporating a specific granular filler, in particular, a granular inorganic filler granulated by using a water-soluble polyester resin as a binder, into a thermoplastic resin (hereinafter occasionally referred to merely as a "resin composition"), can provide a resin composition that is improved in various properties such as extrusion moldability, rigidity, impact resistance, thermal stability and hue, and exhibits an excellent balance between these properties. The present invention has been attained on the basis of the above finding.

That is, in a first aspect of the present invention, there is provided a thermoplastic resin composition comprising:

100 parts by weight of a thermoplastic resin (component A); and 1 to 400 parts by weight of a granular inorganic filler (component B) comprising an inorganic filler having an average particle diameter of 0.01 to 100 μm and a water-soluble polyester resin binder, and having a bulk density of 0.4 to 1.5 g/mL.

In a second aspect of the present invention, there is provided a resin molded article produced by molding the above thermoplastic resin composition.

Effect of the Invention

The thermoplastic resin composition according to the present invention is characterized by being improved in various properties such as extrusion moldability, rigidity, impact resistance, thermal stability and hue, and exhibiting an excellent balance between these properties. The thermoplastic resin composition having the above advantages can be used in various extensive applications. Examples of the applications of the thermoplastic resin composition according to the present invention include parts of electric and electronic equipments, parts of OA equipments, mechanical parts, vehicle parts, building members, various containers, leisure goods, sundries, various housings for cellular phones, etc. In particular, the thermoplastic resin composition according to the present invention can also be suitably used as exterior parts, outside plate parts and interior parts for vehicles.

Specific examples of the exterior parts and outside plate parts for vehicles include outer door handles, bumpers, fenders, door panels, trunk lids, front panels, rear panels, roof panels, bonnets, pillars, side moldings, garnishes, wheel caps, hood bulges, fuel lids, various spoilers, and cowlings of motorcycles. Specific examples of the interior parts for vehicles include inner door handles, center panels, instrument panels, console boxes, luggage floor boards, and housings of displays for car navigation, etc.

PREFERRED EMBODIMENTS FOR CARRYING OUT THE INVENTION

The present invention is described in detail below. However, the following detailed descriptions are concerned with only typical examples of preferred embodiments of the present invention, and not intended to limit the scope of the present invention thereto. Meanwhile, in the present specification, the "group" contained in various compounds involves both substituted and unsubstituted groups, unless departing from the scope of the present invention.

Thermoplastic Resin (Component A):

Examples of the thermoplastic resin used as the component A in the present invention (hereinafter occasionally referred to merely as the "component A") include polyamide resins such as polyamide-6 and polyamide-6,6; aromatic polycarbonate resins; thermoplastic polyester resins such as polyethylene terephthalate resin, polypropylene terephthalate resin and polybutylene terephthalate resin; polyphenylene ether resins; polyacetal resins; styrene-based resins such as polystyrene resin, high-impact polystyrene resin (HIPS), acrylonitrile-styrene copolymer (AS resin), acrylonitrile-butadiene-styrene copolymer (ABS resin), acrylonitrile-styrene-acrylic rubber copolymer (ASA resin) and acrylonitrile-ethylene/propylene-based rubber-styrene copolymer (AES resin); polyolefin resins such as polyethylene resin and polypropylene resin; polyimide resins; polyether imide resins; polyurethane resins; polyphenylene sulfide resins; polysulfone resins; and polymethacrylate resins. These thermoplastic resins may be used alone or in combination of any two or more thereof.

Among these thermoplastic resins, from the viewpoint of a good effect of improving a heat resistance, a rigidity, an impact resistance or a thermal stability of the resulting resin composition as well as a hue thereof, preferred are at least one engineering plastic material selected from the group consisting of aromatic polycarbonate resins, thermoplastic polyester resins, polyamide resins, polyphenylene ether resins and polyacetal resins, and polymer alloys comprising the engineering plastic material and the other thermoplastic resin.

The thermoplastic resin (component A) used in the present invention preferably comprises at least one resin selected from the group consisting of aromatic polycarbonate resins, thermoplastic polyester resins and polyamide resins in an amount of not less than 30 parts by weight on the basis of 100 parts by weight of the thermoplastic resin (component A). In particular, 100 parts by weight of the thermoplastic resin (component A) more preferably comprises 50 to 85 parts by weight of the aromatic polycarbonate resins, and 50 to 15 parts by weight of the thermoplastic polyester resins and/or styrene-based resins.

In the followings, suitable thermoplastic resins used as the thermoplastic resin (component A) in the present invention are more specifically explained.

Aromatic Polycarbonate Resin:

The aromatic polycarbonate resin used in the present invention is a linear or branched thermoplastic aromatic polycarbonate polymer or copolymer which is obtained, for example, by reacting an aromatic dihydroxy compound and a carbonate precursor, or by reacting these compounds with a small amount of a polyhydroxy compound, etc.

Examples of the aromatic dihydroxy compound used as a raw material of the aromatic polycarbonate resin include bis(hydroxyaryl)alkanes such as 2,2-bis(4-hydroxyphenyl)propane (=bisphenol A), 2,2-bis(3,5-bibromo-4-hydroxyphenyl)propane (=tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane and 2,2-bis(4-hydroxyphenyl)-1,1,1,3,3,3-hexafluoropropane.

Further examples of the aromatic dihydroxy compound include bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane; bisphenols having a cardo structure such as 9,9-bis(4-hydroxyphenyl)fluorene and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl.

These aromatic dihydroxy compounds may be used alone or in combination of any two or more thereof. Among the above aromatic dihydroxy compounds, preferred are bis(4- hydroxyphenyl)alkanes, and more preferred is 2,2-bis(4-hydroxyphenyl)propane [=bisphenol A] from the viewpoint of a good impact resistance of the resultant resin composition.

Examples of the carbonate precursor to be reacted with the aromatic dihydroxy compound include carbonyl halides, carbonic acid esters and haloformates. Specific examples of the carbonate precursor include phosgene; diaryl carbonates such as diphenyl carbonate and ditolyl carbonate; dialkyl carbonates such as dimethyl carbonate and diethyl carbonate; and dihaloformates of dihydric phenols. These carbonate precursors may also be used alone or in combination of any two or more thereof.

Also, the aromatic polycarbonate resin may be in the form of a branched aromatic polycarbonate resin obtained by copolymerizing a tri- or more polyfunctional aromatic compound therewith. Examples of the tri- or more polyfunctional aromatic compound include polyhydroxy compounds such as fluoroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene and 1,1,1-tri(4-hydroxyphenyl)ethane; 3,3-bis(4-hydroxyaryl)oxyindole (=isatin bisphenol); 5-chloroisatin; 5,7-dichloroisatin; and 5-bromoisatin. Among these polyfunctional aromatic compounds, preferred is 1,1,1-tri(4-hydroxyphenyl)ethane. The polyfunctional aromatic compound may be used by replacing a part of the above aromatic dihydroxy compound therewith. The amount of the polyhydroxy aromatic compound used is preferably 0.01 to 10 mol % and more preferably 0.1 to 2 mol % on the basis of the aromatic dihydroxy compound.

Next, the process for producing the aromatic polycarbonate resin used in the present invention is described. The process for producing the aromatic polycarbonate resin used in the present invention is not particularly limited. The aromatic polycarbonate resin may be produced by any optional known methods. Examples of the methods for production of the aromatic polycarbonate resin include an interfacial polymerization method, a melting transesterification method, a pyridine method, a ring-opening polymerization method of cyclic carbonate compounds, and a solid-state transesterification method of prepolymers.

Among these production methods, the interfacial polymerization method is first explained. In the polymerization reaction of the production method, the aromatic dihydroxy compound is first reacted with phosgene in the presence of an organic solvent inert to the reaction and an alkali aqueous solution while maintaining the reaction system at a pH of usually not less than 9, if required, using a molecular weight controller (end stopping agent) and an antioxidant for preventing oxidation of the aromatic dihydroxy compound, and then a polymerization catalyst such as a tertiary amine or a quaternary ammonium salt is added to the reaction system to conduct an interfacial polymerization therebetween, thereby obtaining a polycarbonate. The time of addition of the molecular weight controller is not particularly limited, and the molecular weight controller may be added at any time between the reaction with phosgene and initiation of the polymerization reaction without particular limitations. Meanwhile, the reaction temperature is, for example, 0 to 40° C., and the reaction time is, for example, from several minutes (for example, 10 min) to several hours (for example, 6 hr).

Examples of the organic solvent inert to the reaction include chlorinated hydrocarbons such as dichloromethane, 1,2-dichloroethane, chloroform, monochlorobenzene and dichlorobenzene; and aromatic hydrocarbons such as benzene, toluene and xylene. Examples of the alkali compound used for preparing the aqueous alkali solution include hydroxides of alkali metals such as sodium hydroxide and potassium hydroxide.

Examples of the molecular weight controller include compounds having a monovalent phenolic hydroxyl group. Specific examples of the compounds having a monovalent phenolic hydroxyl group include m-methyl phenol, p-methyl phenol, m-propyl phenol, p-propyl phenol, p-tert-butyl phenol and p-long chain alkyl-substituted phenols. The amount of the molecular weight controller used is preferably 50 to 0.5 mol and more preferably 30 to 1 mol on the basis of 100 mol of the aromatic dihydroxy compound.

Examples of the polymerization catalyst include tertiary amines such as trimethylamine, triethylamine, tributylamine, tripropylamine, trihexylamine and pyridine; and quaternary ammonium salts such as trimethylbenzyl ammonium chloride, tetramethyl ammonium chloride and triethylbenzyl ammonium chloride.

Next, the melting transesterification method is explained. The polymerization reaction of the production method may be conducted, for example, by subjecting a carbonic diester and an aromatic dihydroxy compound to transesterification reaction. Examples of the carbonic diester include dialkyl carbonate compounds such as dimethyl carbonate, diethyl carbonate and di-tert-butyl carbonate; diphenyl carbonate; and substituted diphenyl carbonates such as ditolyl carbonate. Among these carbonic diesters, preferred are diphenyl carbonate and substituted diphenyl carbonates, and more preferred is diphenyl carbonate.

Also, the amount of an end hydroxyl group contained in the aromatic polycarbonate resin has a large influence on thermal stability, hydrolysis stability and color tone of the obtained polycarbonate resin, and, therefore, may be appropriately controlled by conventionally known optional methods. In the reaction of the melting transesterification method, the mixing ratio between the carbonic diester and the aromatic dihydroxy compound as well as the vacuum degree used upon the transesterification reaction are usually controlled to achieve a desired molecular weight of the obtained polycarbonate resin and a desired amount of the end hydroxyl group therein.

In the melting transesterification reaction, the carbonate diester is usually used in not less than an equimolar amount and preferably in an amount of 1.01 to 1.30 mol on the basis of 1 mol of the aromatic dihydroxy compound. In order to positively control the amount of the end hydroxyl group, there may be used such a method of separately adding an end stopping agent upon the reaction. Examples of the end stopping agent include monohydric phenols, monovalent carboxylic acids and carbonic diesters.

Upon producing the polycarbonates by the melting transesterification method, the reaction is usually conducted in the presence of a transesterification catalyst. The transesterification catalyst used in the reaction is not particularly limited, and is preferably an alkali metal compound and/or an alkali earth metal compound. The transesterification catalyst may be used in combination with a basic compound as an auxiliary component such as a basic boron compound, a basic phosphorus compound, a basic ammonium compound and an amine-based compound. The transesterification reaction using the above raw materials may be conducted at a temperature of 100 to 320° C., and then the transesterification reaction product may be subjected to melt-polycondensation reaction under reduced pressure finally reaching not more than 2 mm Hg, while removing by-products such as aromatic hydroxy compounds from the reaction mixture.

The melt-polycondensation may be conducted by either a batch method or a continuous method, and is preferably conducted by a continuous method from the viewpoints of a good stability, etc., of the aromatic polycarbonate resin used in the present invention and the resultant resin composition of the present invention. Examples of the preferred catalyst deactivator used in the melting transesterification method include compounds capable of neutralizing the transesterification catalyst, for example, sulfur-containing acid compounds and derivatives formed therefrom. Such a catalyst deactivator is added in an amount of preferably 0.5 to 10 equivalents and more preferably 1 to 5 equivalents on the basis of the alkali metal contained in the catalyst, and further preferably 1 to 100 ppm and more preferably 1 to 20 ppm on the basis of the polycarbonate.

The molecular weight of the aromatic polycarbonate resin used in the present invention may be appropriately determined, and is controlled such that the viscosity-average molecular weight [Mv] calculated from a solution viscosity thereof is preferably in the range of 10,000 to 50,000. The aromatic polycarbonate having a viscosity-average molecular weight of not less than 10,000 tends to be further improved in mechanical strength, and can be therefore more suitably used in the applications requiring a higher mechanical strength. Whereas, the aromatic polycarbonate having a viscosity-average molecular weight of not more than 50,000 tends to be more effectively prevented from undergoing deterioration in fluidity, and is more preferable from the viewpoint of facilitated molding process.

The viscosity-average molecular weight of the aromatic polycarbonate resin is more preferably 12,000 to 40,000 and still more preferably 14,000 to 30,000. Also, two or more kinds of aromatic polycarbonate resins that are different in viscosity-average molecular weight from each other may be used in the form of a mixture thereof. Further, the above aromatic polycarbonate resin may also be mixed with those aromatic polycarbonate resins having a viscosity-average molecular weight which is out of the above-specified range, if required.

Meanwhile, the viscosity-average molecular weight [Mv] as used in the present invention means the value calculated from an intrinsic viscosity [η] (unit: dL/g) as measured at 20° C. in methylene chloride as a solvent using an Ubbellohde viscometer, according to Schnell's viscosity formula: $\eta = 1.23 \times 10^{-4} M^{0.83}$ wherein the intrinsic viscosity [η] is the value calculated from a specific viscosity [$\eta_{sp}$] as measured at each solution concentration [C] (g/dL) according to the following formula:

$$\eta = \lim_{c \to 0} \eta_{sp}/c.$$

The end hydroxyl group concentration of the aromatic polycarbonate resin used in the present invention is usually not more than 1000 ppm, preferably not more than 800 ppm and more preferably not more than 600 ppm. The lower limit of the end hydroxyl group concentration of the aromatic polycarbonate resin, in particular, such an aromatic polycarbonate resin produced by transesterification method, is not less than 10 ppm, preferably not less than 30 ppm and more preferably not less than 40 ppm.

When the end hydroxyl group concentration of the aromatic polycarbonate resin is controlled to not less than 10 ppm, the aromatic polycarbonate resin is prevented from undergoing deterioration in a molecular weight thereof, resulting in such a tendency that the obtained resin composition is further enhanced in mechanical properties. Also, when the end hydroxyl group concentration of the aromatic polycarbonate resin is controlled to not more than 1000 ppm, the obtained resin composition tends to be further enhanced in retention thermal stability and color tone. Meanwhile, the unit of the above end hydroxyl group concentration expressed by "ppm" represents a weight of the end hydroxyl group based on the weight of the aromatic polycarbonate resin. The end hydroxyl group concentration may be measured by colorimetric quantity determination using a titanium tetrachloride/acetic acid method (the method described in "Macromol. Chem.", 88, 215 (1965)).

In addition, the aromatic polycarbonate resin used in the present invention may also comprise an aromatic polycarbonate oligomer in order to improve an appearance of a molded article obtained therefrom as well as a fluidity of the resin composition. The viscosity-average molecular weight [Mv] of the aromatic polycarbonate oligomer is preferably 1,500 to 9,500 and more preferably 2,000 to 9,000. The aromatic polycarbonate oligomer is usually used in an amount of not more than 30% by weight based on the weight of the aromatic polycarbonate resin component.

Further, in the present invention, as the aromatic polycarbonate resin, there may also be used not only the virgin resin, but also those aromatic polycarbonate resins regenerated from used resin products, i.e., so-called material-recycled aromatic polycarbonate resins. Examples of the used resin products include optical recording media such as optical discs, light guide plates, transparent members for vehicles such as automobile window glass, automobile headlamp lenses and windshields, containers such as water bottles, spectacle lenses, and building materials such as sound insulating walls, glass windows and corrugated sheets. Further, there may also be used nonconforming products and crushed or pulverized products obtained from sprues and runners as well as pellets obtained by melting these products. The amount of the regenerated aromatic polycarbonate resin used is preferably not more than 80% by weight and more preferably not more than 50% by weight based on the weight of the aromatic polycarbonate resin component.

Thermoplastic Polyester Resin:

The thermoplastic polyester resins used in the present invention are in the form of a polymer or copolymer obtained by subjecting a dicarboxylic acid component comprising a dicarboxylic acid or a reactive derivative thereof and a diol component comprising a diol or an ester derivative thereof, as main components, to condensation reaction.

The thermoplastic polyester resin used in the present invention may be produced by an ordinary polymerization method in which the dicarboxylic acid component and the diol component are reacted with each other under heating in the presence of a polycondensation catalyst comprising titanium, germanium, antimony, etc., while discharging water and lower alcohols as by-products from the reaction system. The polymerization method may be conducted by either a batch method or a continuous method. Further, the resultant polymer or copolymer may be subjected to solid-state polymerization to increase a polymerization degree thereof.

The dicarboxylic acid may be either an aromatic dicarboxylic acid or an aliphatic dicarboxylic acid. Among them, the aromatic dicarboxylic acid is preferred from the viewpoints of a good heat resistance and a good dimensional stability. Specific examples of the aromatic dicarboxylic acids include terephthalic acid, isophthalic acid, orthophthalic acid, 1,5-naphthalene dicarboxylic acid, 2,6-naphthalene dicarboxylic acid, 4,4'-biphenyl dicarboxylic acid, 4,4'-biphenylether dicarboxylic acid, 4,4'-biphenylmethane dicarboxylic acid, 4,4'-biphenylsulfone dicarboxylic acid, 4,4'-biphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylene dicarboxylic acid and 2,5-pyridine dicarboxylic acid. In addition, there may also be used substituted products of these acids (for example, alkyl-substituted products such as 5-methyl isophthalic acid) as well as reactive derivatives of these acids (for example, alkyl ester derivatives such as dimethyl terephthalate and diethyl terephthalate).

Among these compounds, more preferred are terephthalic acid, 2,6-naphthalene dicarboxylic acid and alkyl ester derivatives thereof, and still more preferred are terephthalic acid and alkyl ester derivatives thereof. These aromatic dicarboxylic acids may be used alone or in combination of any two or more thereof. These aromatic dicarboxylic acids may also be used in combination with one or more kinds of aliphatic dicarboxylic acids such as adipic acid, azelaic acid, sebacic acid and dodecanedioic acid, and alicyclic dicarboxylic acid such as cyclohexanedicarboxylic acid.

Specific examples of the diols include aliphatic diols such as ethylene glycol, 1,2-propylene glycol, 1,3-propanediol, 1,4-butanediol, neopentyl glycol, 1,5-pentanediol, 1,6-hexanediol, decamethylene glycol and 2,2-dimethyl-1,3-propanediol; alicyclic diols such as 1,4-cyclohexanedimethanol, 1,3-cyclohexanedimethanol, cyclohexanediol and trans- or cis-2,2,4,4-tetramethyl-1,3-cyclobutanediol; aromatic diols such as p-xylylenediol, bisphenol A, tetrabromobisphenol A and tetrabromobisphenol A-bis(2-hydroxyethyl ether); and substituted products thereof.

Among these diols, from the viewpoints of good thermal stability and impact resistance, etc., preferred are ethylene glycol, 1,3-propanediol, 1,4-butanediol and 1,4-cyclohexanedimethanol, and more preferred are ethylene glycol, 1,3-propanediol and 1,4-butanediol. These diols may be used alone or in combination of any two or more thereof. Further, as the diol component, the above diols may be used in combination with one or more kinds of long-chain diols having a molecular weight of 400 to 6,000 such as polyethylene glycol, poly-1,3-propylene glycol and polytetramethylene glycol, and both may be copolymerized with the dicarboxylic acid component.

In addition, the thermoplastic polyester resin used in the present invention may have a branched structure by introducing a small amount of a branching agent thereinto. Examples of the branching agent include trimesic acid, trimelitic acid, trimethylol ethane, trimethylol propane and pentaerythritol, though not particularly limited thereto.

Specific examples of the suitable thermoplastic polyester resin used in the present invention include polyethylene terephthalate resin (PET), polypropylene terephthalate resin (PPT), polybutylene terephthalate resin (PBT), polyhexylene terephthalate resin, polyethylene naphthalate resin (PEN), polybutylene naphthalate resin (PBN), poly(1,4-cyclohexanedimethylene terephthalate) resin (PCT) and polycyclohexylcyclohexylate (PCC). Among these thermoplastic polyester resins, PET, PPT and PBT are preferred from the viewpoints of good fluidity and impact resistance.

Specific examples of the other thermoplastic polyester resin used in the present invention include polypivalolactone resins and poly(ε-caprolactone) resins obtained by ring-opening polymerization of lactones, and liquid crystal polymers capable of forming a liquid crystal in a melted state (Thermotropic Liquid Crystal Polymer: TLCP). Specific examples of commercially available products of the liquid crystal polyester resins include "X7G" produced by Eastman Kodak Co., "Xyday" produced by Dartoco Corp., "Econol" produced by Sumitomo Chemical Corp., and "Vectra" produced by Ceraneed Corp.

The thermoplastic polyester resin used in the present invention preferably has an intrinsic viscosity of 0.4 to 1.5 dL/g and more preferably 0.5 to 1.3 dL/g. The intrinsic viscosity as used herein is the value measured at 30° C. in a solvent containing phenol and tetrachloroethane at a weight ratio of 50/50. When the intrinsic viscosity of the thermoplastic polyester resin is less than 0.4 dL/g, the resultant resin composition tends to be deteriorated in impact resistance. On the other hand, when the intrinsic viscosity of the thermoplastic polyester resin is more than 1.5 dL/g, the resultant resin composition tends to be deteriorated in fluidity. The end carboxyl group content in the thermoplastic polyester resin may be optionally determined. However, when the end carboxyl group content is too small, the resultant resin composition tends to be deteriorated in impact resistance, while when the end carboxyl group content is too large, the resultant resin composition tends to be insufficient in wet-heat resistance and thermal stability. Therefore, the end carboxyl group content is usually 5 to 50 μeq/g and preferably 10 to 30 μeq/g.

Further, as the thermoplastic polyester resin used in the present invention, there may also be used not only the virgin resin material, but also those thermoplastic polyester resins regenerated from used resin products, i.e., so-called material-recycled thermoplastic polyester resins. Examples of the used resin products mainly include containers, films, sheets and fibers. Among these products, more preferred are containers such as PET bottles. Further, as the regenerated thermoplastic polyester resins, there may also be used nonconforming products and crushed or pulverized products obtained from sprues and runners as well as pellets obtained by melting these products.

Polyamide Resin:

The polyamide resin used in the present invention has a —CO—NH— bond in a polymer main chain thereof, and is capable of being melted under heating. As the polyamide resin, there may be used polymers of lactams having 3 or more-membered ring, polymers of polymerizable ω-amino acids, or those polyamide resins obtained by polycondensing a dibasic acid with a diamine, etc. Specific examples of the polyamide resin include polymers of ε-caprolactam, aminocaproic acid, enanthlactam, 7-amino-heptanoic acid, 11-amino-undecanoic acid, 9-amino-nonanoic acid, α-pyrrolidone and α-piperidone; and polymers or copolymers obtained by polycondensing a diamine such as hexamethylenediamine, nonamethylenediamine, undecamethylenediamine, dodecamethylenediamine and m-xylylenediamine with a dibasic acid such as terephthalic acid, isophthalic acid, adipic acid, sebacic acid, dodecanedioic acid and glutaric acid.

Typical examples of the polyamide resin include polymers such as polyamide-4, polyamide-6, polyamide-12, polyamide-6.6, polyamide-4.6, polyamide-6T and polyamide-MXD6; and copolymers such as polyamide-6/6.6, polyamide-6/12, polyamide-6/6T and polyamide-6T/6I. In the present invention, a plurality of these polyamide resins may be used in combination. Among these polyamide resins, preferred are polyamide-6, polyamide-6.6 and polyamide-MXD6 which may be used in combination with polyamide-6/6.6 or polyamide-6T/6I.

The polyamide resin used in the present invention preferably has a relative viscosity of 2 to 7 and more preferably 2.2 to 5 as measured at 23° C. in a 98% by weight concentrated sulfuric acid by adjusting a concentration of the polyamide resin therein to 1% by weight. As to the concentrations of end groups of the polyamide resin, the end carboxyl group content therein is preferably not more than 100 µeq/g, and the ratio of the end carboxyl group content to the end amino group content (end carboxyl group content/end amino group content) therein is preferably 0.8 to 4. When the ratio of the end carboxyl group content/end amino group content is less than 0.8, the resultant composition tends to be insufficient in fluidity, while when the ratio of the end carboxyl group content/end amino group content is more than 4, the resultant composition tends to be insufficient in impact resistance.

Styrene-Based Resin:

The styrene-based resin used in the present invention is at least one polymer selected from the group consisting of styrene-based polymers produced from styrene-based monomers, copolymers produced by copolymerizing the styrene-based monomers with the other vinyl-based monomers copolymerizable with the styrene-based monomers, and copolymers produced by copolymerizing the styrene-based monomers in the presence of rubber polymers or copolymerizing the styrene-based monomers with the other vinyl-based monomers copolymerizable with the styrene-based monomers in the presence of rubber polymers. Among these styrene-based resins, preferred are the copolymers produced by copolymerizing the styrene-based monomers in the presence of rubber polymers or copolymerizing the styrene-based monomers with the other vinyl-based monomers copolymerizable with the styrene-based monomers in the presence of rubber polymers.

Specific examples of the styrene-based monomers include styrene, and styrene derivatives such as α-methyl styrene, p-methyl styrene, divinyl benzene, ethylvinyl benzene, dimethyl styrene, p-t-butyl styrene, bromostyrene and dibromostyrene. Among these styrene-based monomers, preferred is styrene. These styrene-based monomers may be used alone or in the form of a mixture of any two or more thereof.

Examples of the vinyl-based monomers copolymerizable with the styrene-based monomers include vinyl cyanide compounds such as acrylonitrile and methacrylonitrile; acrylic acid alkyl esters such as methyl acrylate, ethyl acrylate, propyl acrylate, butyl acrylate, amyl acrylate, hexyl acrylate, 2-ethylhexyl acrylate, octyl acrylate and cyclohexyl acrylate; methacrylic acid alkyl esters such as methyl methacrylate, ethyl methacrylate, propyl methacrylate, butyl methacrylate, amyl methacrylate, hexyl methacrylate, 2-ethylhexyl methacrylate, octyl methacrylate and cyclohexyl methacrylate; acrylic acid aryl esters such as phenyl acrylate and benzyl acrylate; methacrylic acid aryl esters such as phenyl methacrylate and benzyl methacrylate; epoxy group-containing acrylic acid esters or methacrylic acid esters such as glycidyl acrylate and glycidyl methacrylate; maleimide-based monomers such as maleimide, N,N-methyl maleimide and N-phenyl maleimide; and α,β-unsaturated carboxylic acids or anhydrides thereof such as acrylic acid, methacrylic acid, maleic acid, maleic anhydride, fumaric acid and itaconic acid.

Further, examples of the rubber polymers copolymerizable with the styrene-based monomers include polybutadiene; polyisoprene; styrene-butadiene random copolymers and block copolymers; acrylonitrile-butadiene random copolymers and block copolymers; acrylonitrile-butadiene copolymers; copolymers of acrylic acid alkyl esters or methacrylic acid alkyl esters with butadiene; polybutadiene-polyisoprene diene-based copolymers; ethylene-isoprene random copolymers and block copolymers; ethylene-α-olefin copolymers such as ethylene-butene random copolymers and block copolymers; copolymers of ethylene with an α,β-unsaturated carboxylic acid ester such as ethylene-methacrylate copolymers and ethylene-butyl acrylate copolymers; ethylene-vinyl acetate copolymers; ethylene-propylene-non-conjugated diene terpolymers such as ethylene-propylene-hexadiene copolymers; and composite rubbers produced from acrylic rubbers, polyorganosiloxane rubbers, and poly(alkyl acrylate or methacrylate) rubbers.

Specific examples of the styrene-based resins include high-impact polystyrene (HIPS), acrylonitrile-styrene copolymer (AS resin), acrylonitrile-butadiene-styrene copolymer (ABS resin), methyl methacrylate-acrylonitrile-butadiene-styrene copolymer (MABS resin), acrylonitrile-styrene-acrylic rubber copolymer (ASA resin), acrylonitrile-ethylene/propylene-based rubber-styrene copolymer (AES resin), styrene-methyl methacrylate copolymer (MS resin) and styrene-maleic anhydride copolymer.

Among these styrene-based resins, preferred are AS resin, ABS resin, ASA resin and AES resin, more preferred are ABS resin, ASA resin and AES resin, and still more preferred is ABS resin. These styrene-based resins may be used alone or in the form of a mixture of any two or more thereof.

The method for producing the styrene-based resin used in the present invention is optional, and may be selected from any conventionally known optional methods. Specific examples of the production method include emulsion polymerization, solution polymerization, bulk polymerization, suspension polymerization and bulk/suspension polymerization. Among these production methods, in the present invention, so-called styrene-based polymers or styrene-based random copolymers or block copolymers are preferably produced by bulk polymerization, suspension polymerization or bulk/suspension polymerization, while styrene-based graft copolymers are preferably produced by bulk polymerization, bulk/suspension polymerization or emulsion polymerization.

Among the styrene-based resins used in the present invention, the ABS resin is in the form of a mixture of a thermoplastic graft copolymer obtained by graft-polymerizing a butadiene rubber component with acrylonitrile and styrene, and an acrylonitrile-styrene copolymer. The content of the butadiene rubber component in the ABS resin is preferably 5 to 40% by weight, more preferably 10 to 35% by weight and still more preferably 13 to 25% by weight on the basis of 100% by weight of the ABS resin component. Also, the rubber particle diameter in the ABS resin is preferably 0.1 to 5 µm, more preferably 0.2 to 3 µm, still more preferably 0.3 to 1.5 µm and further still more preferably 0.4 to 0.9 µm. The distribution of the rubber particle diameters may be either a single-peak distribution or a multiple-peak distribution having a plurality of peaks.

Granular Talc (Component B):

The granular inorganic filler as the component B used in the present invention (hereinafter occasionally referred to merely as the "component B") is such a granular inorganic filler which is obtained from an inorganic filler having an average particle diameter of 0.01 to 100 µm and a water-soluble polyester resin binder, and has a bulk density of 0.4 to 1.5 g/mL.

The average particle diameter of the inorganic filler as the raw material of the granular inorganic filler used in the present invention is preferably 0.01 to 100 µm, more preferably 0.05 to 50 µm and still more preferably 0.1 to 25 µm. When the average particle diameter of the inorganic filler is too small, the reinforcing effect of the resultant granular inorganic filler tends to be unsatisfactory, while when the average particle diameter of the inorganic filler is too large, the obtained resin molded article tends to be adversely affected in appearance thereof and further tends to be insufficient in impact resistance. Therefore, the average particle diameter of the inorganic filler is more preferably 0.2 to 15 µm and still more preferably 0.3 to 10 μm. The average particle diameter as used herein means $D_{50}$ measured by a liquid phase precipitation method using X-ray transmission. The measurement of $D_{50}$ may be carried out, for example, by using a Sedigraph particle size analyzer "Model 5100" manufactured by Micromeritics Instruments Corp.

Examples of the inorganic filler as the raw material of the granular inorganic filler used in the present invention include silicate compounds such as wollastonite, talc, mica, zonotlite, sepiolite, attapulgite and kaolinite; composite oxides such as potassium titanate, titanium oxide, alumina oxide and zinc oxide; carbonate compounds such as calcium carbonate; sulfate compounds such as barium sulfate and calcium sulfate; carbon-based fillers such as graphite and carbon black; silica; glass-based fillers such as glass flakes and glass beads; and aluminum borate. These inorganic filers may be used alone or in combination of any two or more thereof.

Among the granular inorganic fillers used in the present invention, from the viewpoints of a good balance between rigidity, fluidity, impact resistance and appearance of the obtained product, preferred are granular silicate compounds such as wollastonite, talc, mica, zonotlite, sepiolite, attapulgite and kaolinite. In particular, the granular talc is more preferably used as the granular inorganic filler.

The granular talc as the granular inorganic filler (component B) used in the present invention is a hydrous magnesium silicate having a layer structure which is represented by the chemical formula: $4SiO_2 \cdot 3MgO \cdot H_2O$ and usually comprises 58 to 66% by weight of $SiO_2$, 28 to 35% by weight of MgO and about 5% by weight of $H_2O$. The granular talc may also comprise, as the other trace components, 0.03 to 1.2% by weight of $Fe_2O_3$, 0.05 to 1.5% by weight of $Al_2O_3$, 0.05 to 1.2% by weight of CaO, not more than 0.2% by weight of $K_2O$, not more than 0.2% by weight of $Na_2O$, etc., and has a specific gravity of about 2.7.

In addition, the granular inorganic filler (component B) used in the present invention is preferably subjected to surface treatment in order to enhance an affinity to the resin as the component A, etc. Specific examples of the surface-treating agent include alcohols such as trimethylol ethane, trimethylol propane and pentaerythritol; alkanol amines such as triethylamine; organic silicone-based compounds such as organopolysiloxanes; higher fatty acids such as stearic acid; fatty acid metal salts such as calcium stearate and magnesium stearate; hydrocarbon-based lubricants such as polyethylene wax and liquid paraffin; basic amino acids such as lysine and alginine; polyglycerol and derivatives thereof; and coupling agents such as silane-based coupling agents, titanate-based coupling agents and aluminum-based coupling agents.

Next, the water-soluble polyester resin as the binder used for forming the granular inorganic filler (component B) used in the present invention by granulation is explained. The water-soluble polyester resin means a copolymer obtained by subjecting a dicarboxylic acid component comprising a dicarboxylic acid or a reactive derivative thereof, a diol component comprising a diol or an ester derivative thereof and a water-solubility imparting component as main raw materials, to condensation reaction, which exhibits a good solubility in water. The solubility of the copolymer in water may be appropriately determined and may be controlled by varying a content of the water-solubility imparting component.

The dicarboxylic acid used as the raw material of the water-soluble polyester resin may be in the form of either an aromatic dicarboxylic acid or an aliphatic dicarboxylic acid. From the viewpoints of a good heat resistance of the resultant resin composition, etc., the aromatic dicarboxylic acid is preferred. Specific examples of the aromatic dicarboxylic acid include terephthalic acid, isophthalic acid, orthophthalic acid, 1,5-naphthalenedicarboxylic acid, 2,6-naphthalenedicarboxylic acid, 4,4'-biphenyl dicarboxylic acid, 4,4'-biphenylether dicarboxylic acid, 4,41-biphenylmethane dicarboxylic acid, 4,4'-biphenylsulfone dicarboxylic acid, 4,4'-biphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylene dicarboxylic acid, and 2,5-pyridine dicarboxylic acid. Further, there may also be used substituted products of these acids (for example, alkyl-substituted products such as 5-methylisophthalic acid) or reactive derivatives of these acids (for example, alkyl ester derivatives such as dimethyl terephthalate and diethyl terephthalate).

Among these aromatic dicarboxylic acids, preferred are terephthalic acid, isophthalic acid, 2,6-naphthalene dicarboxylic acid and alkyl ester derivatives of these acids. These aromatic dicarboxylic acids may be use alone or in combination of any two or more thereof. In addition, the aromatic dicarboxylic acids may be used in combination with one or more acids selected from the group consisting of aliphatic dicarboxylic acids such as adipic acid, azelaic acid, sebacic acid, dodecanedioic acid, and alicyclic dicarboxylic acids such as cyclohexane dicarboxylic acid.

Examples of the diol used as the raw material of the water-soluble polyester resins include aliphatic diols such as ethylene glycol, 1,2-propylene glycol, 1,3-propanediol, 1,4-butanediol, neopentyl glycol, 1,5-pentanediol, 1,6-hexanediol, decamethylene glycol and 2,2-dimethyl-1,3-propanediol; alicyclic diols such as 1,4-cyclohexane dimethanol, 1,3-cyclohexane dimethanol, cyclohexanediol and trans- or cis-2,2,4,4-tetramethyl-1,3-cyclobutanediol; aromatic diols such as p-xylenediol, bisphenol A, tetrabromobisphenol A and tetrabromobisphenol A-bis(2-hydroxyethyl ether); and substituted product of these compounds.

Among these diols, from the viewpoint of a good heat resistance of the resultant resin composition, preferred are ethylene glycol, 1,3-propanediol, 1,4-butanediol and 1,4-cyclohexane dimethanol, more preferred are ethylene glycol, 1,3-propanediol and 1,4-butanediol, and most preferred is ethylene glycol. These diols may be used alone or in combination of any two or more thereof. Further, as the diol component, one or more long-chain diol having a molecular weight of 400 to 6000 such as polyethylene glycol, poly-1,3-propylene glycol and polytetramethylene glycol, may also be used in combination with the above diols, and both may be copolymerized with the dicarboxylic acid component.

Examples of the water-solubility imparting component used as the raw material of the water-soluble polyester resin include dicarboxylic acids having a metal sulfonate group, and polyethylene glycol. Among these compounds, from the viewpoint of a good heat resistance, preferred are dicarboxylic acids having a metal sulfonate group.

Examples of the dicarboxylic acids having a metal sulfonate group include alkali metal salts such as sodium salts and potassium salts of 5-sulfo-isophthalic acid, 2-sulfo-isophthalic acid, 4-sulfo-isophthalic acid, sulfo-terephthalic acid, 4-sulfo-naphthalene-2,6-dicarboxylic acid, etc., and ester-forming derivatives of these salts. Among these compounds, from the viewpoint of a good water solubility, preferred are sodium 5-sulfo-isophthalate and ester derivatives thereof.

When the content of the dicarboxylic acid having a metal sulfonate group is too small, the resultant polyester resin tends to be insufficient in water solubility. On the other hand, when the content of the dicarboxylic acid having a metal sulfonate group is too large, the resultant water-soluble polyester resin tends to be insufficient in heat resistance. Therefore, the content of the dicarboxylic acid having a metal sulfonate group in the water-soluble polyester resin is preferably 1 to 40 mol % and more preferably 5 to 35 mol % on the basis of the whole carboxylic acid component as the raw material of the water-soluble polyester resin.

Specific examples of the suitable water-soluble polyester resin as the binder for forming the granular inorganic filler (component B) used in the present invention include copolymers obtained from terephthalic acid, ethylene glycol and sodium 5-sulfo-isophthalate. Examples of commercially available products of the water-soluble polyester resin include "PLUSCOAT Z-221", "PLUSCOAT Z-561" and "PLUSCOAT Z-446" all produced by Go-Oh Kagaku Kogyo Co., Ltd., etc.

The content of the water-soluble polyester resin binder in the granular inorganic filler (component B) used in the present invention may be appropriately selected and determined, and is preferably 0.01 to 5% by weight on the basis of 100% by weight of the granular inorganic filler (component B). When the content of the binder is not less than 0.01% by weight, the granular talc tends to be hardly broken, and the resultant resin composition tends to be further enhanced in various properties, specifically, extrusion moldability, rigidity, impact resistance and thermal stability. On the other hand, when the content of the binder is not more than 5% by weight, the granular inorganic filler as the component B used in the present invention, in particular, granular talc, tends to exhibit a good dispersibility in the resin composition, and the resultant resin composition tends to be further enhanced in appearance of a molded article obtained therefrom as well as impact resistance.

Therefore, the content of the water-soluble polyester resin binder in the granular inorganic filler (component B) used in the present invention is more preferably 0.05 to 3.5% by weight and still more preferably 0.1 to 3% by weight.

The granular inorganic filler (component B) used in the present invention has a bulk density of 0.4 to 1.5 g/mL. When using the granular inorganic filler having a bulk density of not less than 0.4 g/mL, the resultant resin composition of the present invention tends to be further enhanced in various properties, specifically, extrusion moldability, rigidity, impact resistance and thermal stability. On the other hand, when using the granular inorganic filler having a bulk density of not more than 1.5 g/mL, the resultant resin composition tends to be further enhanced in appearance of a molded article obtained therefrom as well as impact resistance. Therefore, the bulk density of the granular inorganic filler (component B) used in the present invention is preferably 0.5 to 1.3 g/mL and more preferably 0.6 to 1.1 g/mL.

The bulk density as used herein means the value measured by the following methods (1) to (3).

(1) The granular inorganic filler is placed on a screen having a mesh size of 1.4 mm and allowed to pass therethrough while lightly uniformly sweeping with a brush.

(2) The granular inorganic filler passed through the screen is charged into a receptacle fitted to a bulk density measuring apparatus prescribed in JIS K5101 until heaping up the receptacle with the granular inorganic filler.

(3) An upper portion of the granular inorganic filler heaped up in the receptacle is wiped off using a spatula through an inlet of the receptacle to measure a weight of the granular inorganic filler in the receptacle and calculate a bulk density of the granular inorganic filler according to the following formula.

Bulk density (g/mL)=(weight (g) of granular inorganic filler in receptacle)/(capacity (mL) of receptacle)

The granular inorganic filler (component B) used in the present invention has such a particle size that a proportion of a 500 μm-mesh screen residue thereof is not less than 55% by weight, preferably not less than 60% by weight, more preferably not less than 70% by weight and still more preferably not less than 90% by weight. When using the granular inorganic filler having such a particle size in which a proportion of a 500 μm-mesh screen residue thereof is not less than 55% by weight, the resultant resin composition tends to be further enhanced in impact resistance and thermal stability.

The particle size of the granular inorganic filler (component B) used in the present invention is the value measured by the following methods (1') to (3') according to JIS Z8801.

(1') The granular inorganic filler is placed on a screen having a mesh size of 2 mm and allowed to pass therethrough while lightly uniformly sweeping with a brush.

(2') The granular inorganic filler passed through the screen is fully charged into a 200 mL beaker, and subjected to sample reduction using a sample reduction device "1305 No. 6" (groove width: 6 mm) manufactured by Yoshida Seisakusho Co., Ltd., until the amount of the granular inorganic filler is reduced to about 30 mL.

(3') Using a screen having a mesh size of 500 μm, the granular inorganic filler thus subjected to sample reduction is sieved therethrough to determine a weight of the granular inorganic filler not passed through the 500 μm-mesh screen (screen residue; oversize) and calculate a proportion of the non-passed granular inorganic filler by dividing the thus measured weight by a whole weight of the granular inorganic filler. Meanwhile, the sieving procedure is carried out at a frequency of 120 cycles/sec for 10 min using an electromagnetic sieve "M-100 Type" manufactured by Tsutsui Rikagaku Kiki Co., Ltd.

The size and shape of the granular inorganic filler (component B) used in the present invention are optional, and may be appropriately selected and determined from various shapes and sizes such as a bar shape, a cylindrical shape, a needle-like shape, a spherical shape, a granular shape, a flake-like shape and an amorphous shape by controlling molding conditions and granulating conditions depending upon the applications thereof. The method for producing the granular inorganic filler is also optional. More specifically, for example, in the case where the bar-shaped or cylindrical granular inorganic filler is to be produced, the axis diameter of the granular inorganic filler may be appropriately adjusted by varying a mesh size of a screen used in a screen-type extrusion molding machine, and the thus molded article may be granulated and then cut into a desired axis length.

The size of the granular inorganic filler (component B) used in the present invention is not particularly limited as long as the bulk density thereof lies within the above specified range. However, when dispersed in a melting kneader or a molding machine, it is more advantageous that the size of the granular inorganic filler is smaller than that of resin pellets used upon melt-kneading or molding. For example, the bar-shaped or cylindrical granular inorganic filler preferably has an average axis diameter of 0.2 to 6 mm and an average axis length of 2 to 6 mm and more preferably a ratio of an average axis diameter to an average axis length of 1:0.5 to 1:2.

The method (granulating method) for producing the granular inorganic filler (component B) used in the present invention is optional, and the granular inorganic filler may be produced by any conventionally known granulating methods.

In order to enhance a kneading property between the inorganic filler and the water-soluble polyester resin binder as the raw materials, impart a good plasticity to the obtained kneaded material upon production of the granules, realize a facilitated production, reduce abrasion in a granulator, and further control a hardness of the resultant granules, it is preferred to add a wetting agent to the inorganic filler and binder.

Usually, a lubricant is added to the inorganic filler and the water-soluble polyester resin, if required, together with a dispersant and other additives, and these components are mixed with each other while stirring using a mixer such as a Henschel mixer and a super-mixer, thereby obtaining a mixture of these components. The thus obtained mixture is kneaded using a screw-type extruder such as a single-screw extruder and a twin-screw extruder, and then extruded therefrom into strands. The extruded strands are cut and granulated, and then dried using a fluidized type dryer or a band heater, thereby obtaining the granular inorganic filler. After drying, the resultant granules may be subjected to classification.

Examples of the lubricant used in the present invention include water, organic solvents, etc. Among these lubricants, from the viewpoints of a low price and a good working efficiency, preferred is water. When using water, a mixture of water and an alcohol may be used. In addition, a water-soluble polyester resin may be previously dissolved or suspended in water. Further, if required, various additives such as, for example, a dispersant, a surfactant, various additives for synthetic resins, dyes, pigments, etc., may be dissolved or suspended in water in order to further enhance a uniformity of the resultant granules.

When using water as the lubricant, the water content in the resultant granular inorganic filler (component B) is preferably controlled to not more than 1% and more preferably not more than 0.5% by drying the granular inorganic filler using a fluidized bed dryer, etc., to remove water therefrom. The drying temperature may be appropriately selected, and is usually 80 to 150° C. and preferably 80 to 110° C.

The amount of the lubricant used may be appropriately determined. However, when the amount of the lubricant used is too small, the effect of addition of the lubricant tends to be insufficient, whereas when the amount of the lubricant used is too large, excessive time and energy tend to be required for removal of the lubricant. Therefore, the amount of the lubricant used is 10 to 150 parts by weight, preferably 15 to 100 parts by weight and more preferably 20 to 60 parts by weight on the basis of 100 parts by weight of a total amount of the inorganic filler and the water-soluble polyester resin as the raw materials of the granular inorganic filler (component B) used in the present invention.

Further, in the present invention, a dispersant may be incorporated in the granular inorganic filler (component B) in order to enhance a dispersibility thereof in resin compositions and resin molded articles. The content of the dispersant in the granular inorganic filler (component B) may be appropriately determined, and is usually 0.05 to 2.0% by weight and preferably 0.1 to 0.5% by weight.

The dispersant used in the present invention may be optionally selected from conventionally known ones. Specific examples of the dispersant include the above-mentioned alcohols, alkanol amines, organic silicone-based compounds, higher fatty acids, fatty acid metal salts, hydrocarbon-based lubricants, basic amino acids, polyglycerol, and derivatives thereof. In the present invention, there may be used one or more dispersants selected from these compounds. In addition, the above surface-treated inorganic filler may be used as the inorganic filler as the raw material of the granular inorganic filler (component B), and further the dispersant may be added thereto and then the resultant mixture may be granulated to obtain the granular inorganic filler (component B) used in the present invention.

Further, in addition to the dispersant, various other additives may be added, if required, to the granular inorganic filler (component B) used in the present invention unless the addition of these additives adversely affects the features or effects of the present invention. Specific examples of the additives include various antioxidants such as hindered phenol-based compounds, various heat stabilizers such as phosphite-based compounds, various ultraviolet absorbers such as benzotriazole-based compounds, benzophenone-based compounds and triazine-based compounds, various flame retardants such as phosphate-based compounds, silicone-based compounds and metal salt-based compounds, various release agents such as olefin waxes and fatty acid ester-based compounds, antibacterial agents and mildew-proof agents such as phenol-based compounds, antistatic agents such as anionic, cationic or nonionic compounds, colorants, light stabilizers, plasticizers, and foaming agents. These additives may also be used in the form of a blended mixture of plural kinds thereof.

Rubber Polymer (Component C):

The thermoplastic resin composition according to the present invention preferably further comprises a rubber polymer as a component C (hereinafter occasionally referred to merely as a "component C") for the purpose of improving an impact resistance of the resin composition. The rubber polymer used in the present invention preferably has a glass transition temperature of not higher than 0° C., in particular, not higher than −20° C., and also involves such a polymer obtained by copolymerizing the rubber polymer with a monomer component copolymerizable therewith. The component C used in the present invention may be selected from any optional known rubber polymers which are generally blended in thermoplastic resin compositions, etc., to improve mechanical properties thereof.

Specific examples of the rubber polymer include polybutadiene, polyisoprene, diene-based copolymers (such as styrene-butadiene copolymers, acrylonitrile-butadiene copolymers and acryl-butadiene rubbers), copolymers of ethylene and α-olefin (such as ethylene-propylene copolymers, ethylene-butene copolymers and ethylene-octene copolymers), copolymers of ethylene and unsaturated carboxylic acid ester (such as ethylene-methacrylate copolymers and ethylene-butyl acrylate copolymers), copolymers of ethylene and an aliphatic vinyl compound, terpolymers of ethylene, propylene and a non-conjugated diene, acrylic rubbers (such as poly(butyl acrylate), poly(2-ethylhexyl acrylate) and butyl acrylate-2-ethylhexyl acrylate copolymers), and silicone-based rubbers (such as polyorganosiloxane rubbers and IPN-type composite rubbers comprising polyorganosiloxane rubber and poly(alkyl(meth)acrylate) rubber). These rubber polymers may be used alone or in combination of any two or more thereof. Meanwhile, the term "(meth)acrylate" means both "acrylate" and "methacrylate", and the below-mentioned term "(meth)acrylic acid" means both "acrylic acid" and "methacrylic acid".

Examples of the suitable monomer component which may be optionally copolymerized with the rubber polymer according to the requirements, include aromatic vinyl compounds, cyanided vinyl compounds, (meth)acrylate compounds, and (meth)acrylic acid compounds. Examples of the other monomer component include epoxy group-containing (meth)acrylate compounds such as glycidyl(meth)acrylate; maleimide compounds such as maleimide, N-methyl maleimide and N-phenyl maleimide; and α,β-unsaturated carboxylic acid compounds such as maleic acid, phthalic acid and itaconic acid, and anhydrides of these acids such as maleic anhydride. These monomer components may also used alone or in combination of any two or more thereof.

In order to improve an impact resistance of the thermoplastic resin composition of the present invention, core/shell type graft copolymers are preferably used as the rubber polymer (component C). Among these copolymers, especially preferred are those core/shell type graft copolymers comprising a core layer formed from at least one rubber polymer selected from the group consisting of butadiene-containing rubbers, butyl acrylate-containing rubbers, 2-ethylhexyl acrylate-containing rubbers and silicone-based rubbers, and a shell layer formed around the core layer which is obtained by copolymerizing at least one monomer component selected from the group consisting of acrylates, methacrylates and aromatic vinyl compounds.

Specific examples of the core/shell type graft copolymer include methyl methacrylate-butadiene-styrene polymers (MBS), methyl methacrylate-butadiene polymers (MB), methyl methacrylate-acrylic rubber polymers (MA), methyl methacrylate-acrylic/butadiene rubber copolymers, methyl methacrylate-acrylic/butadiene rubber-styrene copolymers, and methyl methacrylate-(acryl/silicone IPN (interpenetrating polymer network) rubber) polymers. These rubber polymers may be used alone or in combination of any two or more thereof.

Examples of commercially available products of the core/shell type graft copolymer include EXL series such as PARALOID EXL2315, EXL2602 and EXL2603, KM series such as KM330 and KMM336P, and KCZ series such as KCZ201, all produced by Rohm & Haas Japan Co., Ltd., and METHABLENE S-2001 and SRK-200 both produced by Mitsubishi Rayon Co., Ltd.

Specific examples of the other rubber polymers obtained by copolymerizing the rubber polymer with the monomer component copolymerizable therewith include polybutadiene rubbers, styrene-butadiene copolymers (SBR), styrene-butadiene-styrene block copolymers (SBS), styrene-ethylene/butylene-styrene block copolymers (SEBS), styrene-ethylene/propylene-styrene block copolymers (SEPS), ethylene-ethyl acrylate copolymers (EEA), ethylene-methyl acrylate copolymers (EMA), ethylene-butene copolymers (EBR) and ethylene-octene copolymers (EOR).

Phosphorus-Based Compound (Component D):

The thermoplastic resin composition according to the present invention preferably further comprises a phosphorus-based compound as a component D (hereinafter occasionally referred to merely as a "component D") for the purpose of improving a thermal stability and a hue of the resin composition, unless the addition of the component D adversely affects the aimed effects of the present invention. As the phosphorus-based compound, there may be used optional known phosphorus-based compounds. Specific examples of the phosphorus-based compound include oxo acids of phosphorus such as phosphoric acid, phosphonic acid, phosphorous acid, phosphinic acid and polyphosphoric acid; acid pyrophosphoric acid metal salts such as acid sodium pyrophosphate, acid potassium pyrophosphate and acid calcium pyrophosphate; phosphates of metals of Group 1 or Group 2B such as potassium phosphate, sodium phosphate, cesium phosphate and zinc phosphate; organic phosphate compounds; organic phosphite compounds; and organic phosphonite compounds.

Among these phosphorus-based compounds, preferred are the organic phosphate compounds represented by the following general formula (I) and/or the organic phosphite compounds represented by the following general formula (II).

$$O=P(OH)_m(OR)_{3-m} \quad (I)$$

wherein R is an alkyl group or an aryl group and the plural R groups, if any, may be the same or different; and m is an integer of 0 to 2,

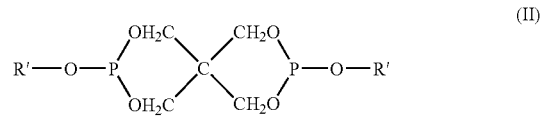

wherein R' is an alkyl group or an aryl group and the R' groups may be the same or different.

In the general formula (I), R is preferably an alkyl group having 1 to 30 carbon atoms or an aryl group having 6 to 30 carbon atoms, and more preferably an alkyl group having 2 to 25 carbon atoms; and m is preferably 1 and/or 2.

In the general formula (II), R' is preferably an alkyl group having 1 to 30 carbon atoms or an aryl group having 6 to 30 carbon atoms. Specific examples of the phosphite represented by the above general formula (II) include distearyl pentaerythritol diphosphite, bis(2,4-di-tert-butylphenyl)pentaerythritol diphosphite and bis(2,6-di-tert-butyl-4-methylphenyl)pentaerythritol diphosphite.

In the thermoplastic resin composition of the present invention, the content of the granular inorganic filler (component B) is 1 to 400 parts by weight on the basis of 100 parts by weight of the thermoplastic resin (component A). When the content of the granular inorganic filler is less than 1 part by weight, the resultant resin composition tends to be insufficient in rigidity. On the contrary, when the content of the granular inorganic filler is more than 400 parts by weight, the resultant resin composition tends to be deteriorated in impact resistance and thermal stability. Therefore, the content of the granular inorganic filler (component B) in the thermoplastic resin composition is preferably 1 to 200 parts by weight, more preferably 1 to 100 parts by weight, still more preferably 3 to 80 parts by weight and further still more preferably 5 to 60 parts by weight on the basis of 100 parts by weight of the thermoplastic resin (component A).

When using the rubber component (component C) in the resin composition of the present invention, the content of the component C therein is preferably 1 to 40 parts by weight, more preferably 3 to 35 parts by weight and still more preferably 5 to 30 parts by weight on the basis of 100 parts by weight of the thermoplastic resin (component A). When blending the component C in an amount of not less than 1 part by weight, the resultant resin composition tends to be enhanced in impact resistance. However, when the content of the component C is more than 40 parts by weight, the resultant resin composition tends to be deteriorated in thermal stability and rigidity.

Also, when using the phosphorus-based compound (component D) in the resin composition of the present invention, the content of the component D therein is preferably 0.1 to 5 parts by weight, more preferably 0.3 to 4 parts by weight and still more preferably 0.5 to 3 parts by weight on the basis of 100 parts by weight of the granular inorganic filler (component B). When blending the component D in an amount of not less than 0.1 part by weight, the resultant resin composition tends to be enhanced in impact resistance, thermal stability and hue. However, when the content of the component D is more than 5 parts by weight, the resultant resin composition tends to be deteriorated in thermal stability.

Other Components:

The thermoplastic resin composition of the present invention may also comprise various additives for resins, if required, unless the addition of these additives adversely affects the aimed effects of the present invention. Examples of the additives for resins include antioxidants, release agents, ultraviolet absorbers, dyes and pigments, flame retardants, dropping inhibitors, antistatic agents, antifogging agents, lubricants, anti-blocking agents, fluidity improvers, plasticizers, dispersants and antibacterial agents. These additives may be used in combination of any two or more thereof. Typical examples of the suitable additives usable in the thermoplastic resin composition of the present invention are more specifically explained below.

Examples of the antioxidant include hindered phenol-based antioxidants. Specific examples of the hindered phenol-based antioxidants include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl)propionate], N,N'-hexane-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphate, 3,3',3'',5,5',5''-hexa-tert-butyl-a,a',a''-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione and 2,6-di-tert-butyl-4-(4,6-bis(octylthio)-1,3,5-triazine-2-ylamino)phenol. These hindered phenol-based antioxidants may be used in combination of any two or more thereof.

Among these hindered phenol-based antioxidants, preferred are pentaerythritol tetrakis[3-(3,5-di-tert-butyl-4-hydroxyphenyl)propionate] and octadecyl-3-(3,5-di-tert-butyl-4-hydroxyphenyl)propionate. The above two phenol-based antioxidants are respectively commercially available under tradenames "IRGANOX 1010" and "IRGANOX 1076" from Ciba Specialty Chemicals, Corp.

The content of the antioxidant in the resin composition is usually 0.001 to 1 part by weight and preferably 0.01 to 0.5 part by weight on the basis of 100 parts by weight of a total amount of the components A and B. When the content of the antioxidant is less than 0.001 part by weight, the effect of the antioxidant added tends to be insufficient. Whereas, when the content of the antioxidant is more than 1 part by weight, the effect of the antioxidant tends to be no longer increased, resulting in uneconomical process.

As the release agent, there may be used at least one compound selected from the group consisting of aliphatic carboxylic acids, esters of aliphatic carboxylic acids and alcohols, aliphatic hydrocarbon compounds having a number-average molecular weight of 200 to 15000, and polysiloxane-based silicone oils.

Examples of the aliphatic carboxylic acids include saturated or unsaturated aliphatic mono-, di- or tri-carboxylic acids. The aliphatic carboxylic acids used herein also involve alicyclic carboxylic acids. Among them, the aliphatic carboxylic acids are preferably mono- or di-carboxylic acids having 6 to 36 carbon atoms and more preferably aliphatic saturated monocarboxylic acids having 6 to 36 carbon atoms. Specific examples of the aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanoic acid, adipic acid and azelaic acid.

As the aliphatic carboxylic acids forming the esters of aliphatic carboxylic acids and alcohols, there may be used the same aliphatic carboxylic acids as described above. Examples of the alcohols include saturated or unsaturated monohydric alcohols and saturated or unsaturated polyhydric alcohols. These alcohols may comprise a substituent group such as a fluorine atom and an aryl group. In particular, among these alcohols, preferred are monohydric or polyhydric saturated alcohols having not more than 30 carbon atoms, and more preferred are aliphatic saturated monohydric alcohols or polyhydric alcohols having not more than 30 carbon atoms. The term "aliphatic" as used herein also involves alicyclic compounds. Specific examples of the alcohols include octanol, decanol, dodecanol, stearyl alcohol, behenyl alcohol, ethylene glycol, diethylene glycol, glycerol, pentaerythritol, 2,2-dihydroxyperfluoropropanol, neopentyl glycol, ditrimethylol propane and dipentaerythritol.

Meanwhile, the above ester compounds may comprise the aliphatic carboxylic acids and/or the alcohols as impurities, and may be in the form of a mixture comprising a plurality of these compounds.

Specific examples of the esters of the aliphatic carboxylic acids and alcohols include beeswax (mixture comprising myricyl palmitate as a main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate and pentaerythritol tetrastearate.

Examples of the aliphatic hydrocarbons having a number-average molecular weight of 200 to 15000 include liquid paraffins, paraffin waxes, micro waxes, polyethylene waxes, Fischer-Tropsch waxes and α-olefin oligomers having 3 to 12 carbon atoms. The aliphatic hydrocarbons as used therein also involve alicyclic hydrocarbons. In addition, these hydrocarbon compounds may be partially oxidized. Among these aliphatic hydrocarbons, preferred are paraffin waxes, polyethylene waxes and partially oxidized polyethylene waxes, and more preferred are paraffin waxes and polyethylene waxes. The number-average molecular weight of the aliphatic hydrocarbons is preferably 200 to 5000. These aliphatic hydrocarbons may be in the form of a single substance or a mixture of various substances which are different in constituting components and molecular weight from each other as long as the content of the main component lies within the above-specified range.

Examples of the polysiloxane-based silicone oils include dimethyl silicone oils, phenylmethyl silicone oils, diphenyl silicone oils and fluorinated alkyl silicones. These silicone oils may be used in combination of any two or more thereof.

The content of the release agent in the resin composition is usually 0.001 to 2 parts by weight and preferably 0.01 to 1 part by weight on the basis of 100 parts by weight of a total amount of the components A and B. When the content of the release agent is less than 0.001 part by weight, the releasing effect tends to be insufficient, whereas when the content of the release agent is more than 2 parts by weight, there tend to arise problems such as deteriorated hydrolysis resistance of the resultant resin composition and contamination of a mold used upon injection molding.

Specific examples of the ultraviolet absorbers include inorganic ultraviolet absorbers such as cerium oxide and zinc oxide; and organic ultraviolet absorbers such as benzotriazole compounds, benzophenone compounds and triazine compounds. Among these ultraviolet absorbers, preferred are the organic ultraviolet absorbers, and more preferred is at least one compound selected from the group consisting of benzotriazole compounds, 2-(4,6-diphenyl-1,3,5-triazine-2-yl)-5-[(hexyl)oxy]-phenol, 2-[4,6-bis(2,4-dimethylphenyl)-1,3,5-triazine-2-yl)-5-(octyloxy)-phenol, 2,2'-(1,4-phenylene)bis[4H-3,1-benzoxazine-4-one], and [(4-methoxyphenyl)-methylene]-propanedioic acid dimethyl ester.

Specific examples of the benzotriazole compounds include a condensed product of methyl-3-[3-tert-butyl-5-(2H-benzotriazole-2-yl)-4-hydroxyphenyl]propionate and polyethylene glycol. Specific examples of the other benzotriazole compounds include 2-bis(5-methyl-2-hydroxyphenyl)benzotriazole, 2-(3,5-di-tert-butyl-2-hydroxyphenyl)benzotriazole, 2-(3',5'-di-tert-butyl-2'-hydroxyphenyl)-5-chlorobenzotriazole, 2-(3-tert-butyl-5-methyl-2-hydroxyphenyl)-5-chlorobenzotriazole, 2-(2'-hydroxy-5'-tert-octylphenyl)benzotriazole, 2-(3,5-di-tert-amyl-2-hydroxyphenyl)benzotriazole, 2-[2-hydroxy-3,5-bis(α,α-dimethylbenzyl)phenyl]-2H-benzotriazole, 2,2'-methylenebis[4-(1,1,3,3-tetramethylbutyl)-6-(2N-benzotriazole-2-yl)phenol], and a condensed product of [methyl-3-[3-tert-butyl-5-(2H-benzotriazole-2-yl)-4-hydroxyphenyl]propionate and polyethylene glycol. These benzotriazole compounds may be used in combination of any two or more thereof.

Among these benzotriazole compounds, preferred are 2-(2'-hydroxy-5'-tert-octylphenyl)benzotriazole, 2-[2-hydroxy-3,5-bis(α,α-dimethylbenzyl)phenyl]-2H-benzotriazole, 2-(4,6-diphenyl-1,3,5-triazine-2-yl)-5-[(hexyl)oxy]-phenol, 2-[4,6-bis(2,4-dimethylphenyl)-1,3,5-triazine-2-yl)-5-(octyloxy)phenol and 2,2'-methylene-bis[4-(1,1,3,3-tetramethylbutyl)-6-(2N-benzotriazole-2-yl)phenol].

The content of the ultraviolet absorber in the resin composition is usually 0.01 to 3 parts by weight and preferably 0.1 to 1 part by weight on the basis of 100 parts by weight of a total amount of the components A and B. When the content of the ultraviolet absorber is less than 0.01 part by weight, the effect of improving a weather resistance of the resin composition tends to be insufficient, whereas when the content of the ultraviolet absorber is more than 3 parts by weight, there tend to arise problems such as mold deposits.

As the dyes and pigments, there may be used inorganic pigments, organic pigments and organic dyes. Examples of the inorganic pigments include carbon blacks; sulfide-based pigments such as cadmium red and cadmium yellow; silicate-based pigments such as ultramarine blue; oxide-based pigments such as titanium oxide, zinc white, red iron oxide, chromium oxide, iron black, titanium yellow, zinc-iron-based brown, titanium/cobalt-based green, cobalt green, cobalt blue, copper/chromium-based black and copper/iron-based black; chromate-based pigments such as chrome yellow and molybdate orange; and ferrocyanide-based pigments such as Prussian blue. Examples of the organic pigments and organic dyes include phthalocyanine-based dyes and pigments such as copper phthalocyanine blue and copper phthalocyanine green; azo-based dyes and pigments such as nickel azo yellow; condensed polycyclic dyes and pigments such as thioindigo-based compounds, perynone-based compounds, perylene-based compounds, quinacridone-based compounds, dioxazine-based compounds, isoindolinone-based compounds and quinaphthalone-based compounds; and anthraquinone-based, heterocyclic and methyl-based dyes and pigments. These dyes and pigments may be used in combination of any two or more thereof. Among these dyes and pigments, from the viewpoint of a good thermal stability, preferred are titanium oxide, carbon blacks, cyanine-based compounds, quinoline-based compounds, anthraquinone-based compounds and phthalocyanine-based compounds.

The content of the dyes and pigments in the resin composition is usually not more than 5 parts by weight, preferably not more than 3 parts by weight and more preferably not more than 2 parts by weight on the basis of 100 parts by weight of a total amount of the components A and B. When the content of the dyes and pigments is more than 5 parts by weight, the resultant resin composition tend to be insufficient in impact resistance.

Examples of the flame retardant include halogen-based flame retardants such as polycarbonates of halogenated bisphenol A, brominated bisphenol-based epoxy resins, brominated bisphenol-based phenoxy resins and brominated polystyrenes; phosphate-based flame retardants; organic metal salt-based flame retardants such as dipotassium diphenyl sulfone-3,3'-disulfonate, potassium diphenyl sulfone-3-sulfonate and potassium perfluorobutane sulfonate; and poly-organosiloxane-based flame retardants. Among these flame retardants, preferred are phosphate-based flame retardants.

Specific examples of the phosphate-based flame retardants include triphenyl phosphate, resorcinol-bis(dixylenylphosphate), hydroquinone-bis(dixylenylphosphate), 4,4'-bisphenol-bis(dixylenylphosphate), bisphenol A-bis(dixylenylphosphate), resorcinol-bis(diphenylphosphate), hydroquinone-bis(diphenylphosphate), 4,4'-biphenyl-bis(diphenylphosphate) and bisphenol A-bis(diphenylphosphate). These phosphate-based flame retardants may be used in combination of any two or more thereof. Among these phosphate-based flame retardants, preferred are resorcinol-bis(dixylenylphosphate) and bisphenol A-bis(diphenylphosphate).

The content of the flame retardant in the resin composition is usually 1 to 30 parts by weight, preferably 3 to 25 parts by weight and more preferably 5 to 20 parts by weight on the basis of 100 parts by weight of a total amount of the components A and B. When the content of the flame retardant is less than 1 part by weight, the resultant resin composition tend to be insufficient in flame retardancy, whereas when the content of the flame retardant is more than 30 parts by weight, the resultant resin composition tend to be deteriorated in heat resistance.

Examples of the dropping inhibitor used in the present invention include fluorinated polyolefins such as polyfluoroethylene. Among these fluorinated polyolefins, especially preferred is polytetrafluoroethylene having a fibril-forming property which tends to be readily dispersed in the polymer and cause molecules of the polymer to be bonded to each other therethrough to form a fibrous material. The polytetrafluoroethylene having a fibril-forming property is classified into Type 3 according to ASTM standard. The polytetrafluoroethylene may be used in the form of not only a solid but also an aqueous dispersion. Examples of commercially available products of the polytetrafluoroethylene having a fibril-forming property include "Teflon (registered trademark) 6J" and "Teflon (registered trademark) 30J" both produced by Mitsui-DuPont Fluorochemical Co., Ltd., and "Polyflon" (tradename) produced by Daikin Kogyo Co., Ltd.

The content of the dropping inhibitor in the resin composition is usually 0.02 to 4 parts by weight and preferably 0.03 to 3 parts by weight on the basis of 100 parts by weight of a total amount of the components A and B. When the content of the dropping inhibitor is more than 5 parts by weight, a molded article obtained from the resultant resin composition tend to be deteriorated in appearance.

Process for Production of Thermoplastic Resin Composition:

The process for producing the thermoplastic resin composition of the present invention is optional, and may be appropriately selected from conventionally known optional methods for production of thermoplastic resin compositions. More specifically, the thermoplastic resin composition of the present invention may be produced by the method of previously mixing the above components A and B, if required, together with the optional components C and D as well as various other additives, with each other, using various mixers such as a tumbler and a Henschel mixer, and then melt-kneading the resultant mixture using a Banbury mixer, a roll, a Brabender, a single-screw kneading extruder, a twin-screw kneading extruder, a kneader, etc.

Alternatively, the respective components may be directly fed without being previously mixed, or may be fed after previously mixing only a part of the components, to the extruder through a feeder, and then melt-kneaded, thereby producing the resin composition. This method allows the component B to be fed without being previously mixed with the other components to the extruder through the feeder and melt-kneaded therewith in the extruder to produce the resin composition. Therefore, such a method is preferred from the viewpoint of extrusion molding workability because deterioration in working environmental conditions due to occurrence of scattering or dusting of the granular inorganic filler can be avoided. Further, if the component B is such a granular inorganic filler that tends to readily incur breakage of fibers when melt-kneaded, from the viewpoint of good mechanical properties of the resultant resin composition, there may be suitably used such a method in which the components other than the component B are fed into the extruder at one time on an upstream side portion thereof, and thereafter the component B is fed subsequent to the midstream portion thereof and then melt-kneaded together with the resin components fed previously.

Production of Resin Molded Article:

The process for producing a resin molded article of the present invention is optional, and may be appropriately selected from any conventionally known resin molding methods. More specifically, the resin molded article may be produced, for example, by various ordinary resin molding methods such as an injection molding method, an ultrahigh-speed injection molding method, an injection compression molding method, a two-color molding method, a blow molding method such as a gas-assisted blow molding method, a molding method using an insulated runner mold, a molding method using a rapidly heating mold, an expansion molding method (including supercritical fluid), an insert molding method, an IMC (in-mold coating) molding method, an extrusion molding method, a sheet molding method, a thermoforming method, a rotational molding method, a lamination molding method and a press molding method. In addition, there may also be adopted such a molding method using a hot runner.

Further, in the present invention, from the viewpoints of less amount of wastes, reduction in environmental burden and low costs, upon producing the resin molded article from the resin composition, the virgin material may be mixed with recycled raw materials such as nonconforming products, sprues, runners and used products in order to realize recycling of materials (so-called material-recycling). In this case, the recycled raw materials used are preferably crushed or pulverized to prevent occurrence of defects upon producing the molded article. The content of the recycled raw materials in the molded article is usually not more than 70% by weight, preferably not more than 50% by weight and more preferably not more than 30% by weight on the basis of a total amount of the recycled raw materials and the virgin material.

EXAMPLES

The present invention is described in more detail below by the following Examples. However, these Examples are only illustrative and not intended to limit a scope of the present invention. Meanwhile, in the following examples and comparative examples, the amounts of the respective components blended mean "part(s) by weight".

The following raw materials were prepared upon producing the respective resin compositions in Examples and Comparative Examples. Meanwhile, the relative viscosity was measured at 23° C. in a 98% by weight concentrated sulfuric acid by controlling the concentration of the resin composition therein to 1% by weight.

<Polyamide Resin>

Polyamide-6 (1): "NOVAMIDE 1020J" produced by Mitsubishi Engineering-Plastics Corporation; relative viscosity; 3.5; ratio of end carboxyl group content/end amino group content: 1.0

Polyamide-6 (2): "NOVAMIDE 1010J" produced by Mitsubishi Engineering-Plastics Corporation; relative viscosity: 2.5; ratio of end carboxyl group content/end amino group content: 2.6

<Aromatic Polycarbonate Resin>

Aromatic polycarbonate resin (1): Bisphenol A-type aromatic polycarbonate produced by interfacial polymerization method ("IUPILON S-3000FN" produced by Mitsubishi Engineering-Plastics Corporation; viscosity-average molecular weight: 22,500; end hydroxyl group concentration: 150 ppm)

Aromatic polycarbonate resin (2): Bisphenol A-type aromatic polycarbonate produced by interfacial polymerization method ("IUPILON H-4000FN" produced by Mitsubishi Engineering-Plastics Corporation; viscosity-average molecular weight: 15,500; end hydroxyl group concentration: 150 ppm)

Aromatic polycarbonate resin (3): Bisphenol A-type aromatic polycarbonate produced by interfacial polymerization method ("IUPILON E-2000FN" produced by Mitsubishi Engineering-Plastics Corporation; viscosity-average molecular weight: 28,000; end hydroxyl group concentration: 150 ppm)

<Thermoplastic Polyester Resin>

Polybutylene terephthalate resin (1); "NOVADURAN 5020" produced by Mitsubishi Engineering-Plastics Corporation; intrinsic viscosity: 1.20 dL/g Polybutylene terephthalate resin (2); "NOVADURAN 5008" produced by Mitsubishi Engineering-Plastics Corporation; intrinsic viscosity: 0.85 dL/g Polyethylene terephthalate resin; "NOVAPEX GG500" produced by Mitsubishi Chemical Corporation; intrinsic viscosity: 0.76 dL/g <Styrene-Based Resin>

ABS resin: Acrylonitrile-butadiene-styrene copolymer; "SUNTAC AT-08" produced by Nippon A & L Co., Ltd.; butadiene rubber content: 18% by weight <Granular Inorganic Filler>

Granular Talc (1)

Production Example 1

A 20 L Henschel mixer was charged with 4000 g of talc ("HIGH-FILLER #5000PJ" produced by Matsumura Sangyo Co., Ltd.) having an average particle size of 1.8 μm, and then 100 g of a water-soluble polyester aqueous solution comprising 20% by weight of a water-soluble polyester resin obtained from terephthalic acid, ethylene glycol and sodium 5-sulfo-isophthalate ("PLUSCOAT Z-221" produced by Go-Oh Kagaku Kogyo Co., Ltd.) and 1520 g of clean water were added thereinto over 2 min while stirring the contents of the mixer at a high speed by operating an agitation blade at 1500 rpm. After adding the aqueous solution, the resultant mixture was further continuously stirred for 3 min, thereby obtaining a clay-like kneaded material.

Next, the thus obtained kneaded material was extruded and granulated using a roll basket type granulating apparatus equipped with a 1.2 mm-mesh screen, and then dried using a fluidized bed dryer at a hot air temperature of 100° C. for about 60 min, thereby obtaining a granular talc. Further, the particle size of the granular talc was uniformed using a granulator, thereby obtaining cylindrical granules having an average axis diameter of 1.2 mm and an average axis length of 1.5 mm (hereinafter referred to merely as the "granular talc (1)"). As a result, it was confirmed that the thus obtained granular talc (1) had a content of the water-soluble polyester resin of 0.5% by weight, a bulk density of 0.70 g/mL, a 500 μm-mesh screen residue (as a particle size) of 95% by weight and a water content of 0.2%.

Granular Talc (2)

Production Example 2

The granulating procedure was conducted in the same manner as defined in Production Example 1 except that the water-soluble polyester aqueous solution (Z-221) and the clean water were used in amounts of 200 g and 1440 g, respectively, thereby obtaining a granular talc (2). As a result, it was confirmed that the thus obtained granular talc (2) had a content of the water-soluble polyester resin of 1% by weight, a bulk density of 0.70 g/mL, a 500 μm-mesh screen residue (as a particle size) of 98% by weight and a water content of 0.4%.

Granular Talc (3)

Production Example 3

The granulating procedure was conducted in the same manner as defined in Production Example 1 except that a water-soluble polyester aqueous solution comprising 25% by weight of a water-soluble polyester resin obtained from terephthalic acid, ethylene glycol and sodium 5-sulfo-isophthalate ("PLUSCOAT Z-561" produced by Go-Oh Kagaku Kogyo Co., Ltd.) and clean water were used in amounts of 80 g and 1540 g, respectively, thereby obtaining a granular talc (3). As a result, it was confirmed that the thus obtained granular talc (3) had a content of the water-soluble polyester resin of 0.5% by weight, a bulk density of 0.68 g/mL, a 500 μm-mesh screen residue (as a particle size) of 94% by weight and a water content of 0.3%.

Granular Inorganic Fillers for Comparative Examples

Granular talc (4): "MTB-12" produced by Matsumura Sangyo Co., Ltd.; average particle size of talc: 1.8 μm; bulk density: 0.74 g/mL; 500 μm-mesh screen residue (as a particle size): 98% by weight; particle shape: cylindrical; average axis diameter: 1.2 mm; average axis length: 1.5 mm; kind of binder: CMC ("CELOGEN 7A" produced by Dai-Ichi Kogyo Seiyaku Co., Ltd.); content of binder: 0.3% by weight; content of water as lubricant: 0.11%

Granular talc (5): "MTB-11" produced by Matsumura Sangyo Co., Ltd.; average particle size of talc: 1.8 μm; bulk density: 0.72 g/mL; 500 μm-mesh screen residue (as a particle size): 97% by weight; particle shape: cylindrical; average axis diameter: 1.2 mm; average axis length: 1.5 mm; kind of binder: second-class glue (JIS K6503, "AGX-5195B" produced by Nitta Gelatin Co., Ltd.); content of binder: 0.5% by weight; content of water as lubricant: 0.12%

Granular talc (6): "MTB-5" produced by Matsumura Sangyo Co., Ltd.; average particle size of talc: 1.8 μm; bulk density: 0.69 g/mL; 500 μm-mesh screen residue (as a particle size): 92% by weight; particle shape: cylindrical; average axis diameter: 1.2 mm; average axis length: 1.5 mm; kind of binder: bentonite; content of binder: 0.5% by weight; content of water as lubricant: 0.15%

Inorganic Fillers for Comparative Examples

Powdery talc: "HIGH-FILLER #5000PJ" produced by Matsumura Sangyo Co., Ltd.; average particle size: 1.8 μm; bulk density: 0.12 g/mL; 500 μm-mesh screen residue (as a particle size): 0% by weight Compressed talc: "UPN HS-T0.8" produced by Hayashi Kasei Co., Ltd.; degassed compressed product; average particle size: 2 μm; bulk density: 0.8 g/mL; 500 μm-mesh screen residue (as a particle size): 32% by weight <Rubber Polymer>

Rubber polymer (1): Core/shell type graft copolymer comprising poly(alkyl acrylate) (core)/alkyl acrylate-alkyl methacrylate copolymer (shell); "EXL2315" produced by Rohm & Haas Japan Co., Ltd.

Rubber polymer (2): Core/shell type graft copolymer comprising polybutadiene (core)/alkyl acrylate-alkyl methacrylate copolymer (shell); "EXL2603" produced by Rohm & Haas Japan Co., Ltd.

<Phosphorus-Based Compound>

Phosphorus-based compound: Chemical formula: $O=P(OH)_{n'}(C_{18}H_{37})_{3-n'}$ (mixture of the compound wherein n'=1 and the compound wherein n'=2); "ADKASTAB AX-71" produced by Asahi Denka Kogyo Co., Ltd.

<Other Components>

Antioxidant: Pentaerythritol tetrakis[3-(3,5-di-tert-butyl-4-hydroxyphenyl)propionate]; "IRGANOX 1010" produced by Ciba Specialty Chemicals Corp.

Release agent: Pentaerythritol tetrastearate; "UNISTAR H476" produced by Nippon Oils & Fats Co., Ltd.

Production of Resin Composition and Production of Test Specimen

Examples 1 to 3 and Comparative Examples 1 to 5

The respective components as shown in Table 1 were uniformly mixed at the proportions shown in the same Table with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 250° C. and a screw rotating speed of 300 rpm, and extruded therefrom, thereby obtaining a resin composition in the form of pellets.

The pellets obtained from the above-produced resin composition were dried at 120° C. for 6 hr or longer, and then molded using an injection molding machine "M150AII-SJ Model" manufactured by Meiki Seisakusho Co., Ltd., at a cylinder temperature of 250° C., a mold temperature of 80° C. and a molding cycle time of 55 sec, thereby producing an ASTM test specimen and a 100 mmφ disc-shaped molded article (having a thickness of 3 mm).

Example 4 to 10 and Comparative Examples 6 to 10

The respective components as shown in Tables 2 and 3 were uniformly mixed at the proportions shown in the same Tables with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 260° C. and a screw rotating speed of 300 rpm, and extruded therefrom, thereby obtaining a resin composition in the form of pellets.

The pellets obtained from the above-produced resin composition were dried at 110° C. for 6 hr or longer, and then molded using an injection molding machine "M150AII-SJ Model" manufactured by Meiki Seisakusho Co., Ltd., at a cylinder temperature of 260° C., a mold temperature of 80° C. and a molding cycle time of 55 sec, thereby producing an ASTM test specimen and a 100 mmφ disc-shaped molded article (having a thickness of 3 mm). Also, retention molding was carried out at a molding cycle time of 4 min per each cycle, and the disc-shaped retention molded articles subsequent to the 5th shot were respectively subjected to evaluation of properties thereof.

Example 11 to 18 and Comparative Examples 11 to 15

The respective components as shown in Tables 4 and 5 were uniformly mixed at the proportions shown in the same Tables with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 260° C. and a screw rotating speed of 300 rpm, and extruded therefrom, thereby obtaining a resin composition in the form of pellets.

The pellets obtained from the above-produced resin composition were dried at 110° C. for 6 hr or longer, and then molded using an injection molding machine "M150AII-SJ Model" manufactured by Meiki Seisakusho Co., Ltd., at a cylinder temperature of 280° C., a mold temperature of 80° C. and a molding cycle time of 55 sec, thereby producing an ASTM test specimen and a 100 mmφ disc-shaped molded article (having a thickness of 3 mm). Also, retention molding was carried out at a molding cycle time of 5 min per each cycle, and the disc-shaped retention molded articles subsequent to the 5th shot were respectively subjected to evaluation of properties thereof.

<Evaluation Methods>

(1) Extrusion Moldability

The extrusion moldability upon producing the resin composition was evaluated according to the following ratings.

◯: Strands and pellets were readily produced with an extrusion output of not less than 40 k/h without problems such as clogging of a hopper and defective intrusion into an extruder.

X: Problems such as clogging of a hopper and defective intrusion into an extruder occurred, and strands and pellets were not produced unless reducing an extrusion output.

(2) Rigidity (Bending Modulus)

According to ASTM D790, a test specimen having a thickness of 6.4 mm was tested to measure a bending modulus thereof (unit: MPa) at 23° C.

(3) Impact Resistance:

a: Izod Impact Strength:

According to ASTM D256, a notched test specimen having a thickness of 3.2 mm was tested to measure an Izod impact strength thereof (unit: J/m) at 23° C.

b: Surface Impact Strength:

The disc-shaped molded article (ordinary molded article) produced above was subjected to impact test in which the molded article was punched at a punch diameter of ½ inch, a support diameter of 3 inch and a punching speed of 1 m/s using a high-rate impact tester (manufactured by Shimadzu Seisakusho Co., Ltd.). The larger the surface impact strength (breaking energy; unit: J), the more excellent the impact resistance.

(4) Hue:

The disc-shaped molded article (ordinary molded article) produced above was subjected to measurement of YI value thereof by a reflection method (retainer plate: white plate) using a spectro-colorimeter "SE 2000 Model" manufactured by Nippon Denshoku Kogyo Co., Ltd. The smaller the YI value, the more excellent the hue.

(5) Retention Thermal Stability:

a: Surface Appearance:

The surface appearance of the disc-shaped molded article (retention molded article) produced above was observed by naked eyes, and evaluated according to the following ratings.

◯: Almost no surface roughening due to silver streak.

X: Severe surface roughening due to silver streak.

b: Surface Impact Strength:

The disc-shaped molded article (retention molded article) produced above was subjected to impact test in which the molded article was punched at a punch diameter of ½ inch, a support diameter of 3 inch and a punching speed of 1 m/s using a high-rate impact tester (manufactured by Shimadzu Seisakusho Co., Ltd.). The larger the surface impact strength (breaking energy; unit: J), the more excellent the impact resistance.

Example 1 to 18 and Comparative Examples 1 to 15

The respective resin compositions shown in Tables 1 to 5 were produced and evaluated by the above methods. The results are shown in Tables 1 to 5.

TABLE 1

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Composition (wt. part) | | | | | | | | |
| Polyamide-6 resin (1) | 50 | 50 | 50 | 50 | 50 | 50 | 50 | 50 |
| Polyamide-6 resin (2) | 50 | 50 | 50 | 50 | 50 | 50 | 50 | 50 |
| Granular talc (1) | 25 | — | — | — | — | — | — | — |
| Granular talc (2) | — | 25 | — | — | — | — | — | — |
| Granular talc (3) | — | — | 25 | — | — | — | — | — |
| Granular talc (4) | — | — | — | 25 | — | — | — | — |
| Granular talc (5) | — | — | — | — | 25 | — | — | — |
| Granular talc (6) | — | — | — | — | — | 25 | — | — |
| Powdery talc | — | — | — | — | — | — | 25 | — |
| Compressed talc | — | — | — | — | — | — | — | 25 |
| Evaluation results | | | | | | | | |
| Extrusion moldability | ◯ | ◯ | ◯ | ◯ | ◯ | ◯ | X | X |
| Rigidity: Bending modulus (MPa) | 5340 | 5330 | 5310 | 5320 | 5290 | 5330 | 5200 | 5230 |
| Impact resistance: | | | | | | | | |
| Izod impact strength (J/m) | 48 | 47 | 48 | 39 | 39 | 40 | 35 | 33 |
| Surface impact strength (J) | 15 | 16 | 15 | 8 | 7 | 9 | 5 | 4 |
| Hue: YI value | 4.5 | 4.2 | 4.4 | 19.3 | 27.3 | 10.3 | 6.5 | 6.4 |

TABLE 2

|  | Examples | | | | Comparative Examples | | | |
| --- | --- | --- | --- | --- | --- | --- | --- | --- |
|  | 4 | 5 | 6 | 6 | 7 | 8 | 9 | 10 |
| Composition (wt. part) | | | | | | | | |
| Aromatic polycarbonate resin (1) | 35 | 35 | 35 | 35 | 35 | 35 | 35 | 35 |
| Aromatic polycarbonate resin (2) | 35 | 35 | 35 | 35 | 35 | 35 | 35 | 35 |
| ABS resin | 30 | 30 | 30 | 30 | 30 | 30 | 30 | 30 |
| Granular talc (1) | 25 | — | — | — | — | — | — | — |
| Granular talc (2) | — | 25 | — | — | — | — | — | — |
| Granular talc (3) | — | — | 25 | — | — | — | — | — |
| Granular talc (4) | — | — | — | 25 | — | — | — | — |
| Granular talc (5) | — | — | — | — | 25 | — | — | — |
| Granular talc (6) | — | — | — | — | — | 25 | — | — |
| Powdery talc | — | — | — | — | — | — | 25 | — |
| Compressed talc | — | — | — | — | — | — | — | 25 |
| Phosphorus-based compound | 0.25 | 0.25 | 0.25 | 0.25 | 0.25 | 0.25 | 0.25 | 0.25 |
| Antioxidant | 0.1 | 0.1 | 0.1 | 0.1 | 0.1 | 0.1 | 0.1 | 0.1 |
| Release agent | 0.4 | 0.4 | 0.4 | 0.4 | 0.4 | 0.4 | 0.4 | 0.4 |
| Evaluation results | | | | | | | | |
| Extrusion moldability | ◯ | ◯ | ◯ | ◯ | ◯ | ◯ | X | X |
| Rigidity: Bending modulus (MPa) | 4530 | 4520 | 4510 | 4550 | 4500 | 4540 | 4420 | 4450 |
| Impact resistance: | | | | | | | | |
| Izod impact strength (J/m) | 62 | 64 | 63 | 54 | 56 | 53 | 47 | 48 |
| Surface impact strength (J) | 51 | 54 | 52 | 45 | 44 | 40 | 34 | 33 |
| Hue: YI value | 11.7 | 10.3 | 11.4 | 27.5 | 36.5 | 20.3 | 18.5 | 18.6 |
| Retention thermal | | | | | | | | |

TABLE 2-continued

|  | Examples | | | | Comparative Examples | | | |
| --- | --- | --- | --- | --- | --- | --- | --- | --- |
|  | 4 | 5 | 6 | 6 | 7 | 8 | 9 | 10 |
| stability: | | | | | | | | |
| Surface appearance: visually observed | ○ | ○ | ○ | X | X | X | X | X |
| Surface impact strength (J) | 42 | 47 | 43 | 1 | 1 | 1 | 1 | 1 |

TABLE 3

|  | Examples | | | |
| --- | --- | --- | --- | --- |
|  | 7 | 8 | 9 | 10 |
| Composition (wt. part) | | | | |
| Aromatic polycarbonate resin (1) | 75 | 65 | 35 | 10 |
| Aromatic Polycarbonate resin (2) | — | — | 35 | — |
| Aromatic polycarbonate resin (3) | — | — | — | 65 |
| ABS resin | 25 | 35 | 30 | 25 |
| Granular talc (2) | 11 | 25 | 11 | 25 |
| Phosphorus-based compound | 0.1 | 0.25 | 0.1 | 0.3 |
| Antioxidant | 0.1 | 0.1 | 0.1 | 0.1 |
| Release agent | 0.4 | 0.4 | 0.4 | 0.4 |

TABLE 3-continued

|  | Examples | | | |
| --- | --- | --- | --- | --- |
|  | 7 | 8 | 9 | 10 |
| Evaluation results | | | | |
| Extrusion moldability | ○ | ○ | ○ | ○ |
| Rigidity: Bending modulus (MPa) | 3270 | 4430 | 3200 | 4880 |
| Impact resistance: | | | | |
| Izod impact strength (J/m) | 610 | 140 | 210 | 185 |
| Surface impact strength (J) | 71 | 66 | 68 | 65 |
| Hue: YI value | 7.2 | 12.5 | 7.5 | 13.5 |
| Retention thermal stability: | | | | |
| Surface appearance: visually observed | ○ | ○ | ○ | ○ |
| Surface impact strength (J) | 64 | 51 | 59 | 53 |

TABLE 4

|  | Examples | | | Comparative Examples | | | | |
| --- | --- | --- | --- | --- | --- | --- | --- | --- |
|  | 11 | 12 | 13 | 11 | 12 | 13 | 14 | 15 |
| Composition (wt. part) | | | | | | | | |
| Aromatic polycarbonate resin (1) | 28 | 28 | 28 | 28 | 28 | 28 | 28 | 28 |
| Aromatic polycarbonate resin (2) | 42 | 42 | 42 | 42 | 42 | 42 | 42 | 42 |
| Polybutylene terephthalate resin (1) | 30 | 30 | 30 | 30 | 30 | 30 | 30 | 30 |
| Granular talc (1) | 30 | — | — | — | — | — | — | — |
| Granular talc (2) | — | 30 | — | — | — | — | — | — |
| Granular talc (3) | — | — | 30 | — | — | — | — | — |
| Granular talc (4) | — | — | — | 30 | — | — | — | — |
| Granular talc (5) | — | — | — | — | 30 | — | — | — |
| Granular talc (6) | — | — | — | — | — | 30 | — | — |
| Powdery talc | — | — | — | — | — | — | 30 | — |
| Compressed talc | — | — | — | — | — | — | — | 30 |
| Rubber polymer (1) | 15 | 15 | 15 | 15 | 15 | 15 | 15 | 15 |

TABLE 4-continued

|  | Examples | | | Comparative Examples | | | | |
| --- | --- | --- | --- | --- | --- | --- | --- | --- |
|  | 11 | 12 | 13 | 11 | 12 | 13 | 14 | 15 |
| Phosphorus-based compound | 0.3 | 0.3 | 0.3 | 0.3 | 0.3 | 0.3 | 0.3 | 0.3 |
| Evaluation results | | | | | | | | |
| Extrusion moldability | ○ | ○ | ○ | ○ | ○ | ○ | X | X |
| Rigidity: Bending modulus (MPa) | 3860 | 3850 | 3840 | 3860 | 3810 | 3830 | 3640 | 3630 |
| Impact resistance: | | | | | | | | |
| Izod impact strength (J/m) | 86 | 85 | 85 | 81 | 79 | 77 | 45 | 46 |
| Surface impact strength (J) | 56 | 55 | 55 | 51 | 52 | 49 | 31 | 33 |
| Hue: YI value | 5.4 | 5.1 | 5.3 | 16.5 | 26.5 | 11.3 | 8.8 | 8.7 |
| Retention thermal stability: | | | | | | | | |
| Surface appearance: visually observed | ○ | ○ | ○ | X | X | X | X | X |
| Surface impact strength (J) | 41 | 43 | 40 | 23 | 21 | 18 | 3 | 3 |

TABLE 5

|  | Examples | | | | |
| --- | --- | --- | --- | --- | --- |
|  | 14 | 15 | 16 | 17 | 18 |
| Composition (wt. part) | | | | | |
| Aromatic polycarbonate resin (1) | 15 | 33 | 12 | 28 | 28 |
| Aromatic polycarbonate resin (2) | — | 35 | 18 | 42 | 42 |
| Aromatic polycarbonate resin (3) | 55 | — | — | — | — |
| Polybutylene terephthalate resin (1) | 15 | 20 | 40 | — | — |
| Polybutylene terephthalate resin (2) | 15 | 10 | 30 | — | — |
| Polyethylene terephthalate resin | — | — | — | 30 | 30 |
| Granular talc (2) | 6 | 13 | 30 | 30 | 30 |
| Rubber polymer (1) | — | — | 15 | 15 | 15 |
| Rubber polymer (2) | 6 | 13 | — | — | — |
| Phosphorus-based compound | 0.05 | 0.1 | 0.3 | 0.3 | 0.1 |
| Evaluation results | | | | | |
| Extrusion moldability | ○ | ○ | ○ | ○ | ○ |
| Rigidity: Bending modulus (MPa) | 2650 | 2830 | 4100 | 4030 | 2930 |
| Impact resistance: | | | | | |
| Izod impact strength (J/m) | 630 | 145 | 45 | 53 | 90 |
| Surface impact strength (J) | 70 | 66 | 51 | 44 | 59 |
| Hue: YI value | 4.1 | 4.6 | 6.8 | 3.8 | 3.1 |
| Retention thermal stability: | | | | | |
| Surface appearance: visually observed | ○ | ○ | ○ | ○ | ○ |
| Surface impact strength (J) | 65 | 51 | 35 | 33 | 53 |

From the results of Examples and Comparative Examples shown in Tables 1 to 5, the followings were confirmed. The resin compositions obtained in Examples 1 to 3 according to the present invention were excellent in extrusion moldability, rigidity, impact resistance and hue. On the other hand, the resin compositions obtained in Comparative Examples 1 to 5 in which the content of the component B was out of the specific range defined by the present invention were deteriorated in impact resistance and hue, and further the resin compositions obtained in Comparative Examples 4 and 5 were also deteriorated in extrusion moldability.

The resin compositions obtained in Examples 4 to 10 were excellent in extrusion moldability, rigidity, impact resistance, hue and thermal stability. On the other hand, the resin compositions obtained in Comparative Examples 6 to 10 in which the content of the component B was out of the specific range defined by the present invention were deteriorated in impact resistance, hue and thermal stability, and further the resin compositions obtained in Comparative Examples 9 and 10 were also deteriorated in extrusion moldability and rigidity.

The resin compositions obtained in Examples 11 to 18 were excellent in extrusion moldability, rigidity, impact resistance, hue and thermal stability. On the other hand, the resin compositions obtained in Comparative Examples 11 to 15 in which the content of the component B was out of the specific range defined by the present invention were deteriorated in impact resistance, hue and thermal stability, and further the resin compositions obtained in Comparative Examples 14 and 15 were also deteriorated in extrusion moldability and rigidity.

Although the present invention is described above with respect to embodiments which are considered to be most practical and preferable at the present time, the present invention is not limited to these embodiments described in the present specification, and various changes and modifications will be appropriately made within the scope of claims and a whole description of the present specification unless departing from the subject matter and concept of the present invention, and it should be construed that these changes and modifications are involved in the technical scope of the present invention. Meanwhile, the present patent application is based on Japanese Patent Application (No. 2006-111289) filed on Apr. 13, 2006, the entire contents of which are incorporated herein by reference thereto.

The invention claimed is:

1. A thermoplastic resin composition comprising:
100 parts by weight of at least one thermoplastic resin which is
50 to 85 parts by weight of an aromatic polycarbonate resin,
50 to 15 parts by weight of a thermoplastic polyester resin and/or
a styrene-based resin
on the basis of 100 parts by weight of the thermoplastic resin (component A);
1 to 400 parts by weight of a granular talc filler (component B) having a bulk density of 0.4 to 1.5 g/mL, an average particle diameter of 0.01 to 100 µm and a particle size in which a proportion of a 500 µm-mesh screen residue thereof is not less than 55% by weight and 0.1 to 3% by weight of a water-soluble polyester resin binder; and
a phosphorus-based compound (component D) in an amount of 0.1 to 5 parts by weight on the basis of 100 parts by weight of the granular talc filler (component B).

2. A thermoplastic resin composition according to claim 1, further comprising a rubber polymer (component C) in an amount of 1 to 40 parts by weight on the basis of 100 parts by weight of the thermoplastic resin (component A).

3. A resin molded article produced by molding the thermoplastic resin composition as defined in claim 1.

4. A thermoplastic resin composition according to claim 1, wherein the granular talc filler (component B) has a particle size in which a proportion of a 500 µm-mesh screen residue thereof is not less than 70% by weight.

5. A thermoplastic resin composition according to claim 4, wherein the granular talc filler (component B) has a particle size in which a proportion of a 500 µm-mesh screen residue thereof is not less than 90% by weight.

* * * * *